(12) United States Patent
Nishimura

(10) Patent No.: US 9,976,899 B2
(45) Date of Patent: May 22, 2018

(54) SPECTROSCOPIC MEASUREMENT DEVICE, IMAGE FORMING APPARATUS, AND SPECTROSCOPIC MEASUREMENT METHOD

(71) Applicant: Seiko Epson Corporation, Tokyo (JP)

(72) Inventor: Teruyuki Nishimura, Matsumoto (JP)

(73) Assignee: Seiko Epson Corporation (JP)

( * ) Notice: Subject to any disclaimer, the term of this patent is extended or adjusted under 35 U.S.C. 154(b) by 7 days.

(21) Appl. No.: 15/185,440

(22) Filed: Jun. 17, 2016

(65) Prior Publication Data
US 2016/0370230 A1    Dec. 22, 2016

(30) Foreign Application Priority Data

Jun. 18, 2015 (JP) .................. 2015-123320

(51) Int. Cl.
| | |
|---|---|
| G01N 21/25 | (2006.01) |
| G01J 3/02 | (2006.01) |
| G01J 3/26 | (2006.01) |
| G01J 3/51 | (2006.01) |
| G03G 15/01 | (2006.01) |
| G02B 26/00 | (2006.01) |
| H04N 1/60 | (2006.01) |

(52) U.S. Cl.
CPC ............... *G01J 3/021* (2013.01); *G01J 3/26* (2013.01); *G01J 3/51* (2013.01); *G02B 26/001* (2013.01); *G03G 15/01* (2013.01); *H04N 1/6033* (2013.01); *H04N 1/6044* (2013.01)

(58) Field of Classification Search
CPC ..... G01J 3/021; G01J 3/26; G01J 3/51; G02B 26/001; G03G 15/01; H04N 1/6033

USPC ......................................................... 356/416
See application file for complete search history.

(56) References Cited

U.S. PATENT DOCUMENTS

| | | | |
|---|---|---|---|
| 6,844,930 B2 | 1/2005 | Kobayashi et al. | |
| 8,315,282 B2 | 11/2012 | Huber et al. | |
| 8,670,129 B2 | 3/2014 | Flanders et al. | |
| 8,848,196 B2 | 9/2014 | Nishimura et al. | |
| 9,291,502 B2 | 3/2016 | Nishimura | |

(Continued)

FOREIGN PATENT DOCUMENTS

| | | | |
|---|---|---|---|
| JP | 2002-277326 A | 9/2002 | |
| JP | 2004-150903 A | 5/2004 | |

(Continued)

*Primary Examiner* — Hina F Ayub

(74) *Attorney, Agent, or Firm* — Harness, Dickey & Pierce, P.L.C.

(57) ABSTRACT

A printer includes a spectroscope that includes a wavelength-selective interference filter on which light from a measurement target is incident and a carriage moving unit that moves the spectroscope in an X direction with respect to the measurement target. The wavelength-selective interference filter includes a pair of reflecting films and an electrostatic actuator that changes a gap dimension between the pair of reflecting films. A first spectroscopic measurement process that performs spectroscopic measurement while the gap dimension between the reflecting films is decreasing and a second spectroscopic measurement process that performs spectroscopic measurement while the gap dimension is increasing are alternately performed during the movement of the spectroscope by the carriage moving unit in the X direction.

16 Claims, 13 Drawing Sheets

(56) References Cited

U.S. PATENT DOCUMENTS

2007/0291291 A1* 12/2007 Vilar .................... H04N 1/3878
 358/1.9
2013/0201475 A1* 8/2013 Yamazaki ............. G01J 3/0208
 356/302
2013/0308134 A1 11/2013 Hirokubo

FOREIGN PATENT DOCUMENTS

| JP | 2010-276362 A | 12/2010 |
| JP | 2012-506636 A | 3/2012 |
| JP | 2013-504216 A | 2/2013 |
| JP | 2013-092474 A | 5/2013 |
| JP | 2013-238755 A | 11/2013 |
| JP | 2014-013177 A | 1/2014 |
| JP | 2016-118468 A | 6/2016 |

\* cited by examiner

FIG. 10

| COLOR PATCH | MEASUREMENT ORDER | PEAK ORDINAL NUMBER | WAVELENGTH [nm] | GAP BETWEEN REFLECTING FILMS [nm] | CHANGE IN GAP DIMENSION [nm] |
|---|---|---|---|---|---|
| 1 | 1 | SECONDARY | 600 | 523.2 | |
| | 2 | SECONDARY | 580 | 502.1 | 21.1 |
| | 3 | SECONDARY | 560 | 481.1 | 21.1 |
| | 4 | SECONDARY | 540 | 460.0 | 21.1 |
| | 5 | SECONDARY | 520 | 438.9 | 21.1 |
| | 6 | SECONDARY | 500 | 417.8 | 21.1 |
| | 7 | SECONDARY | 480 | 396.8 | 21.1 |
| | 8 | SECONDARY | 460 | 375.7 | 21.1 |
| | 9 | SECONDARY | 440 | 354.6 | 21.1 |
| | 10 | SECONDARY | 420 | 333.5 | 21.1 |
| | 11 | SECONDARY | 400 | 312.4 | 21.1 |
| | 12 | PRIMARY | 700 | 276.1 | 36.3 |
| | 13 | PRIMARY | 680 | 265.8 | 10.3 |
| | 14 | PRIMARY | 660 | 255.5 | 10.3 |
| | 15 | PRIMARY | 640 | 245.2 | 10.3 |
| | 16 | PRIMARY | 620 | 234.9 | 10.3 |
| i+1 | 1 | PRIMARY | 620 | 234.9 | 0.0 |
| | 2 | PRIMARY | 640 | 245.2 | −10.3 |
| | 3 | PRIMARY | 660 | 255.5 | −10.3 |
| | 4 | PRIMARY | 680 | 265.8 | −10.3 |
| | 5 | PRIMARY | 700 | 276.1 | −10.3 |
| | 6 | SECONDARY | 400 | 312.4 | −36.3 |
| | 7 | SECONDARY | 420 | 333.5 | −21.1 |
| | 8 | SECONDARY | 440 | 354.6 | −21.1 |
| | 9 | SECONDARY | 460 | 375.7 | −21.1 |
| | 10 | SECONDARY | 480 | 396.8 | −21.1 |
| | 11 | SECONDARY | 500 | 417.8 | −21.1 |
| | 12 | SECONDARY | 520 | 438.9 | −21.1 |
| | 13 | SECONDARY | 540 | 460.0 | −21.1 |
| | 14 | SECONDARY | 560 | 481.1 | −21.1 |
| | 15 | SECONDARY | 580 | 502.1 | −21.1 |
| | 16 | SECONDARY | 600 | 523.2 | −21.1 |

SPECTROSCOPIC MEASUREMENT DEVICE, IMAGE FORMING APPARATUS, AND SPECTROSCOPIC MEASUREMENT METHOD

BACKGROUND

1. Technical Field

The present invention relates to a spectroscopic measurement device, an image forming apparatus, and a spectroscopic measurement method.

2. Related Art

In the related art, there is known a wavelength-selective interference filter in which a transmitted wavelength can be switched by changing a gap dimension between reflecting films, and also known is a color measuring device that includes the wavelength-selective interference filter (for example, refer to JP-A-2013-238755).

In the color measuring device of JP-A-2013-238755, a measurement target is irradiated with light, and light reflected by the measurement target is incident on the wavelength-selective interference filter. Then, the wavelength-selective interference filter transmits light of a predetermined wavelength, and transmitted light is detected by a detector. At this time, the wavelength-selective interference filter is controlled to sequentially change the gap dimension between the reflecting films, thereby sequentially switching the wavelength of the transmitted light, and the intensity of light having each of the wavelengths is detected by the detector. Accordingly, a spectrum (color) of the measurement target can be measured.

The measurement target may be spectroscopically measured during movement of the color measuring device in which the color measuring device moves relative to the measurement target such as a color patch formed by a printer or the like. In this case, the spectroscopic measurement is required to be performed while a position of measurement performed by the color measuring device moves on the measurement target. However, if the speed of relative movement of the color measuring device is excessively increased, the position of color measurement, for example, is deviated from the measurement target, thereby preventing obtaining of an accurate measurement result. Thus, the speed of movement of the color measuring device is required to be set in such a manner to obtain an accurate measurement result in the spectroscopic measurement, thereby posing the problem that the amount of measurement time is increased.

SUMMARY

An advantage of some aspects of the invention is to provide a spectroscopic measurement device, an image forming apparatus, and a spectroscopic measurement method enabling prompt measurement.

According to an application example of the invention, there is provided a spectroscopic measurement device including a spectroscope that includes a wavelength-selective interference filter on which light from a measurement target is incident, and a moving mechanism that moves the spectroscope relative to the measurement target in a predetermined direction, in which the wavelength-selective interference filter includes a pair of reflecting films and a gap changer that changes a gap dimension between the pair of reflecting films, and a first spectroscopic measurement that performs spectroscopic measurement while the gap dimension is decreasing and a second spectroscopic measurement that performs the spectroscopic measurement while the gap dimension is increasing are alternately performed during the relative movement of the spectroscope in the predetermined direction.

In this application example, the first spectroscopic measurement that performs spectroscopic measurement while the gap dimension in the wavelength-selective interference filter is gradually decreased and the second spectroscopic measurement that performs spectroscopic measurement while the gap dimension is gradually increased are alternately performed during the relative movement of the spectroscope in the predetermined direction.

In a case of performing spectroscopic measurement using the wavelength-selective interference filter, spectroscopic measurement in a predetermined wavelength range is performed by gradually decreasing (or increasing) the gap dimension between the reflecting films from an initial dimension and detecting light that is output from the wavelength-selective interference filter. At this time, if the gap dimension returns again to the initial dimension at the time of performing subsequent spectroscopic measurement, the reflecting films vibrate by an amount corresponding to the change in the gap dimension. Since an accurate measurement result is not obtained if spectroscopic measurement is performed in this state, in general, subsequent spectroscopic measurement is initiated by waiting for a period until which the vibration stops and after the stoppage of the vibration. In this case, the start timing of the spectroscopic measurement is delayed, and the amount of time related to measurement is increased.

Regarding this matter, in this application example, as described above, the first spectroscopic measurement that performs a wavelength scan in such a manner that the gap dimension is decreasing and the second spectroscopic measurement that performs a wavelength scan in such a manner that the gap dimension is increasing are alternately performed. In this case, the gap dimension is not required to return again to the initial dimension after changing from the initial dimension to a minimum gap dimension in the first spectroscopic measurement, and the second spectroscopic measurement can be continuously performed. Similarly, the gap dimension is not required to return to the minimum gap dimension after changing from the minimum gap dimension to a maximum gap dimension (initial dimension) in the second spectroscopic measurement, and the first spectroscopic measurement can be continuously performed. That is, alternate performance of the first spectroscopic measurement and the second spectroscopic measurement allows a reduction in the vibration of the reflecting films at the end of each instance of spectroscopic measurement (first spectroscopic measurement and second spectroscopic measurement), and the wait time period related to the stoppage of the vibration is decreased. Therefore, each instance of spectroscopic measurement can be started early in time by an amount corresponding to a decrease in the wait time period. Accordingly, if, for example, the speed at which the spectroscope is moved is set to a constant speed at which spectroscopic measurement (first spectroscopic measurement and second spectroscopic measurement) of the measurement target can be performed, the spectroscopic measurement itself can be performed at an early timing compared with the related art. Thus, the total amount of time of a measurement process (hereinafter, referred to as a scan measurement process) performed on the entirety of the measurement target can be decreased.

In the spectroscopic measurement device of the application example, it is preferable that, in a case where the measurement target is a plurality of color patches that is arranged in the predetermined direction, the spectroscope is relatively moved in the predetermined direction, and that the first spectroscopic measurement and the second spectroscopic measurement are switched each time a region measured by the spectroscope is switched from one of the plurality of color patches to another one of the plurality of color patches.

In this application example, the plurality of color patches is set as the measurement target, and spectroscopic measurement (first spectroscopic measurement and second spectroscopic measurement) using the spectroscope is performed when the region measured by the spectroscope (position of measurement) is positioned on the color patches. In such a configuration, if the spectroscope is relatively moved in the predetermined direction, the position of measurement is also moved in the direction. The first spectroscopic measurement and the second spectroscopic measurement are switched each time the color patch that overlaps with the position of measurement is switched, that is, each time the measurement target color patch is switched after the position of measurement performed by the spectroscope moves across the color patches.

In this case, by performing at least one of the first spectroscopic measurement and the second spectroscopic measurement on, for example, one color patch, spectroscopic measurement of the color patch can be accurately performed.

In this application example, the width dimension of each color patch may be set in such a manner that at least one of the first spectroscopic measurement and the second spectroscopic measurement can be performed when the position of measurement performed by the spectroscope is positioned within the color patch. That is, the width dimension of each color patch is not required to be set by taking into account the wait time period until which the vibration of the reflecting films stops as in the scan measurement process of the related art, and the width dimension of each color patch can be set on the basis of the speed of movement of the spectroscope and the period of time for a wavelength scan performed by changing the gap dimension. Accordingly, the width dimension of each color patch can be decreased. If the number of color patches in the predetermined direction is determined, the total amount of time related to the scan measurement process can be decreased by an amount corresponding to a decrease in the width dimension of each color patch as described above. If the number of color patches in the predetermined direction can be changed, more color patches can be arranged in the predetermined direction in quantities corresponding to a decrease in the width dimension of each color patch. In this case, more color patches can be measured in a short amount of time, and the amount of time related to the scan measurement process performed on the measurement target is further decreased.

In the spectroscopic measurement device of the application example, it is preferable that, in a case where the measurement target is a color patch, the first spectroscopic measurement and the second spectroscopic measurement are alternately switched in a period during which a region measured by the spectroscope overlaps with the color patch.

In this application example, the first spectroscopic measurement and the second spectroscopic measurement are switched in the period during which the position of measurement performed by the spectroscope exists on the color patch. That is, spectroscopic measurement is performed a plurality of times by alternately switching the first spectroscopic measurement and the second spectroscopic measurement in the period during which the position of measurement performed by the spectroscope moves on one color patch. In such a configuration, spectroscopic measurement of the color patch can be performed with a higher accuracy on the basis of measurement results from spectroscopic measurement that is performed a plurality of times on one color patch.

In the spectroscopic measurement device of the application example, it is preferable that the first spectroscopic measurement and the second spectroscopic measurement are alternately switched in a period during which the region measured by the spectroscope overlaps with one of the plurality of color patches.

In this application example, as described above, in a case of setting the plurality of color patches as the measurement target, the first spectroscopic measurement and the second spectroscopic measurement are switched when the position of measurement performed by the spectroscope moves between the color patches, and spectroscopic measurement is performed a plurality of times by switching the first spectroscopic measurement and the second spectroscopic measurement even in the period during which the position of measurement moves on one color patch. In this case, as in the above application example, spectroscopic measurement of the color patches can be performed with a high accuracy on the basis of measurement results from spectroscopic measurement that is performed a plurality of times on one color patch.

In the spectroscopic measurement device of the application example, it is preferable that the moving mechanism relatively moves the spectroscope during a period from the end of the first spectroscopic measurement until the start of the second spectroscopic measurement and a period from the end of the second spectroscopic measurement until the start of the first spectroscopic measurement at a speed that is greater than a speed of the movement of the spectroscope at a time of performing the first spectroscopic measurement and a speed of the movement of the spectroscope at a time of performing the second spectroscopic measurement.

In this application example, the speed of movement of the spectroscope is set to be greater than the speed of movement at the time of spectroscopic measurement between the first spectroscopic measurement and the second spectroscopic measurement. As described above, since the wait time period until which the vibration of the reflecting films stops can be decreased in this application example, it is not necessary to dispose a long wait time period between the first spectroscopic measurement and the second spectroscopic measurement. Thus, increasing the speed of movement when the position of measurement performed by the spectroscope is moved from the first measurement region in which the first spectroscopic measurement is performed to the second measurement region in which the second spectroscopic measurement is performed (or from the second measurement region to the first measurement region) allows spectroscopic measurement of a subsequent measurement region to be performed more promptly, and the amount of time related to the scan measurement process can be further decreased.

According to another application example of the invention, there is provided a spectroscopic measurement device including a spectroscope that includes a spectroscopic element on which light from a measurement target is incident, and a moving mechanism that moves the spectroscope relative to the measurement target in a predetermined direction, in which a first region measurement process that performs spectroscopic measurement of a first measurement region of the measurement target and a second region measurement process that performs spectroscopic measurement of a second measurement region which is arranged further on a side to which the spectroscope is relatively moved than the first measurement region are performed during the relative movement of the spectroscope in the predetermined direction, and the spectroscope is relatively moved during a period from the end of the first region measurement process until the start of the second region measurement process at a speed that is greater than a speed of the relative movement of the spectroscope in the first region measurement process and in the second region measurement process.

In this application example, while the spectroscope is relatively moved in the predetermined direction, spectroscopic measurement of the first measurement region in the measurement target (first region measurement process) is performed, and then, spectroscopic measurement of the second measurement region (second region measurement process) is performed. At this time, the speed of the relative movement of the spectroscope in the first region measurement process and in the second region measurement process is a speed (speed at the time of spectroscopic analysis) that is based on the dimension of the first measurement region in the direction of movement of the spectroscope and the amount of time related to spectroscopic measurement (wavelength scan). Meanwhile, the spectroscope is moved at a speed that is greater than the speed at the time of spectroscopic analysis between the first measurement region and the second measurement region.

In this case, the total amount of time related to measurement (scan measurement process) of the entirety of the measurement target can be decreased by an amount corresponding to an increase in the speed of movement of the spectroscope during the period in which spectroscopic measurement is not performed, compared with a case where the spectroscope is moved in the predetermined direction at, for example, the speed at the time of spectroscopic analysis.

In the spectroscopic measurement device of the application example, it is preferable that, in a case where the measurement target is a plurality of color patches that is arranged in the predetermined direction, the first measurement region and the second measurement region are regions of different color patches.

As in the above application example, spectroscopic measurement can be performed at least once on each color patch. When the position of measurement performed by the spectroscope moves between the color patches, increasing the speed of movement of the spectroscope allows spectroscopic measurement of the subsequent color patch to be performed at an earlier timing, and as a consequence, the total amount of time of the scan measurement process can be decreased.

According to still another application example of the invention, there is provided an image forming apparatus including the above spectroscopic measurement device and an image forming unit that forms an image on an image formation target.

In the application example, the image forming unit forms a color patch on the image formation target, after which the spectroscopic measurement device can perform spectroscopic measurement of the color patch formed. In such an image forming apparatus, it is possible to check whether the color of the color patch formed is the same as the color that the image forming unit is instructed to form, and feedback can be provided to the image forming unit in accordance with a spectroscopic measurement result if the colors are different.

According to still another application example of the invention, there is provided a spectroscopic measurement method for a spectroscopic measurement device that includes a spectroscope which includes a wavelength-selective interference filter on which light from a measurement target is incident and includes a moving mechanism which moves the spectroscope relative to the measurement target in a predetermined direction, the wavelength-selective interference filter including a pair of reflecting films and a gap changer that changes a gap dimension between the pair of reflecting films, the method including first spectroscopic measuring that performs spectroscopic measurement while the gap dimension is decreasing during the relative movement of the spectroscope in the predetermined direction, and second spectroscopic measuring that performs spectroscopic measurement while the gap dimension is increasing during the relative movement of the spectroscope in the predetermined direction, in which the first spectroscopic measuring and the second spectroscopic measuring are alternately performed.

In this application example, the first spectroscopic measuring that performs a wavelength scan in such a manner that the gap dimension is decreasing and the second spectroscopic measuring that performs a wavelength scan in such a manner that the gap dimension is increasing are alternately performed as in the above application example. Accordingly, vibration of the reflecting films at the end of each instance of spectroscopic measurement (first spectroscopic measuring and second spectroscopic measuring) can be reduced, and the wait time period related to the stoppage of the vibration can be decreased. Thus, the amount of time related to the measurement process performed on the entirety of the measurement target can be decreased by an amount corresponding to a decrease in the wait time period.

According to still another application example of the invention, there is provided a spectroscopic measurement method for a spectroscopic measurement device that includes a spectroscope which includes a spectroscopic element on which light from a measurement target is incident and includes a moving mechanism which moves the spectroscope relative to the measurement target in a predetermined direction, the method including first region measuring that performs spectroscopic measurement of a first measurement region of the measurement target using the spectroscope while the spectroscope is relatively moved at a first speed, moving that relatively moves the spectroscope at a second speed from the first measurement region to a second measurement region which is arranged further on a side to which the spectroscope is relatively moved than the first measurement region, and second region measuring that performs spectroscopic measurement of the second measurement region using the spectroscope while the spectroscope is relatively moved by the moving mechanism at a third speed, in which the second speed is greater than the first speed and the third speed.

In this application example, as in the above application example, the position of measurement in the spectroscope can be promptly moved from the first measurement region to the second measurement region, and the amount of time related to the measurement can be decreased.

BRIEF DESCRIPTION OF THE DRAWINGS

The invention will be described with reference to the accompanying drawings, wherein like numbers reference like elements.

FIG. 10 is a diagram illustrating a measurement wavelength, a measurement ordinal number, a gap dimension between reflecting films, and a change in the gap dimension in spectroscopic measurement of each of two contiguous color patches in the first embodiment.

DESCRIPTION OF EXEMPLARY EMBODIMENTS

First Embodiment

Hereinafter, a first embodiment according to the invention will be described on the basis of the drawings. In the present embodiment, a printer 10 (ink jet printer) that includes a spectroscopic measurement device will be described as an example of an image forming apparatus of the invention.

Schematic Configuration of Printer

Figure 1:
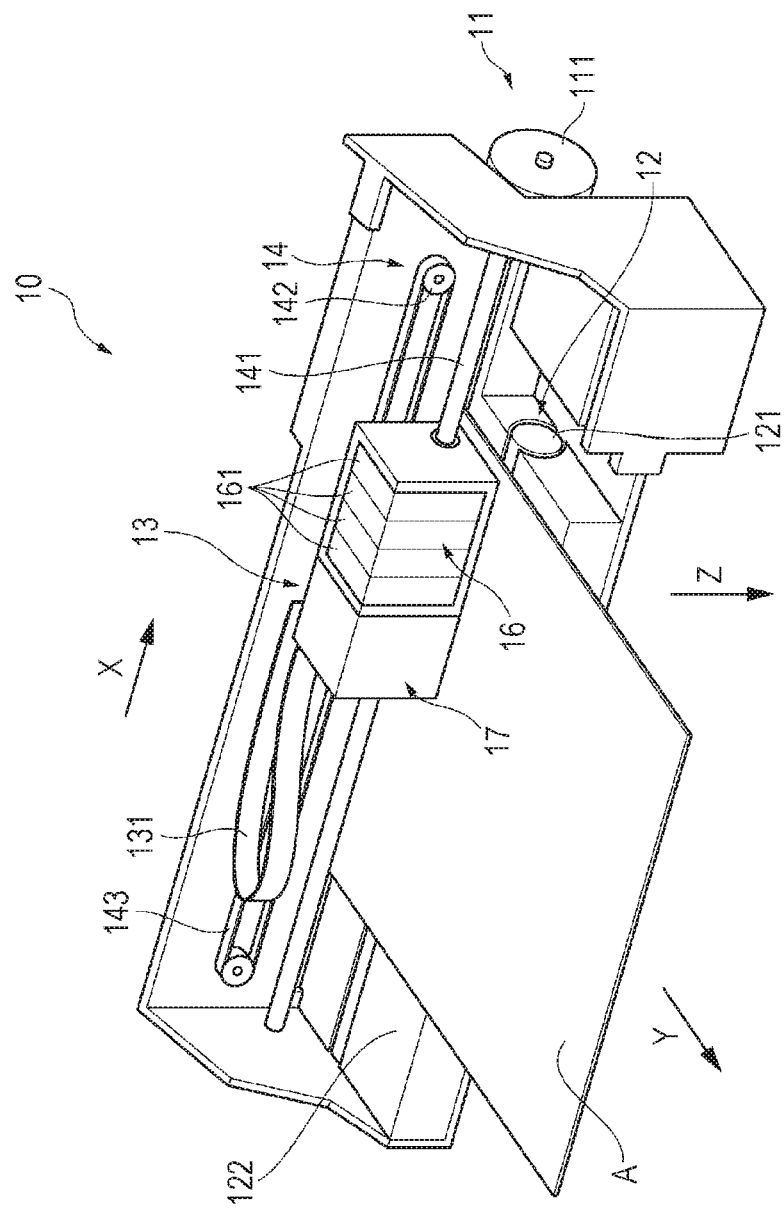
FIG. 1 is an exterior view illustrating a schematic configuration of a printer of a first embodiment according to the invention.
Figure 2:
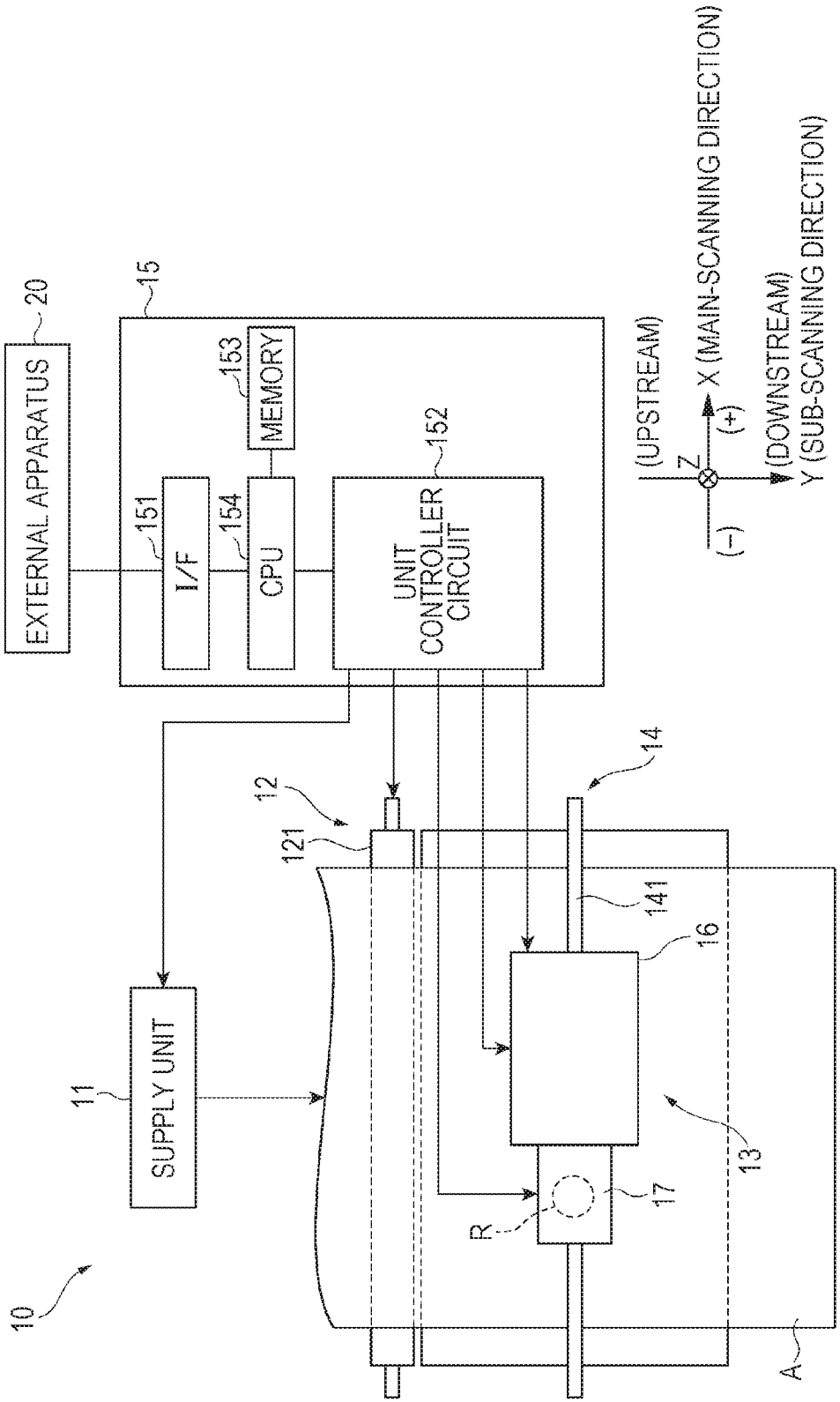
FIG. 2 is a block diagram illustrating a schematic configuration of the printer of the first embodiment.

FIG. 1 is a diagram illustrating an exterior configuration example of the printer 10 of the first embodiment. FIG. 2 is a block diagram illustrating a schematic configuration of the printer 10 of the present embodiment.

As illustrated in FIG. 1, the printer 10 includes a supply unit 11, a transport unit 12, a carriage 13, a carriage moving unit 14, and a control unit 15 (refer to FIG. 2). The printer 10 controls each of the units 11, 12, and 14 and the carriage 13 on the basis of print data that is input from an external apparatus 20 such as a personal computer and prints an image on a medium A. In addition, the printer 10 of the present embodiment forms a measurement color patch 31 (refer to FIGS. 7, 8, 9 and the like) at a predetermined position on the medium A on the basis of preset calibration print data and spectroscopically measures the color patch 31. Accordingly, the printer 10 determines whether a color shift is present in the printed color by comparing an actual measured value from the color patch 31 with the calibration print data and, if a color shift is present, corrects color on the basis of the actual measured value.

Hereinafter, each configuration of the printer 10 will be specifically described.

The supply unit 11 is a unit that supplies the medium A (illustrated as white paper in the present embodiment), an image formation target, to the position of image formation. The supply unit 11, for example, includes a roll body 111 (refer to FIG. 1) on which the medium A is wound, a roll drive motor (not illustrated), and a roll drive wheel array (not illustrated). The roll drive motor is rotationally driven in response to an instruction from the control unit 15, and the torque of the roll drive motor is transmitted to the roll body 111 through the roll drive wheel array. Accordingly, the roll body 111 is rotated, and the paper wound on the roll body 111 is supplied downstream (+Y direction) in a Y direction (sub-scanning direction).

While the present embodiment illustrates supply of paper that is wound on the roll body 111, the present embodiment is not limited to this. The medium A may be supplied by any supply method such as supplying the medium A such as paper stacked in a tray or the like, for example, one sheet at a time by a roller or the like.

The transport unit 12 transports the medium A supplied from the supply unit 11 in the Y direction. The transport unit 12 is configured to include a transport roller 121, a driven roller (not illustrated) that is arranged to interpose the medium A between the transport roller 121 and the driven roller and is driven by the transport roller 121, and a platen 122.

A drive force is transmitted from a transport motor, not illustrated, to the transport roller 121. If the transport motor is driven under control of the control unit 15, the transport roller 121 is rotationally driven by the torque of the transport motor and transports in the Y direction the medium A that is interposed between the transport roller 121 and the driven roller. The platen 122 that faces the carriage 13 is disposed downstream (+Y side) of the transport roller 121 in the Y direction.

The carriage 13 includes a printing unit 16 that prints an image on the medium A and a spectroscope 17 that spectroscopically measures a predetermined measurement target region R (position of measurement; refer to FIG. 2) on the medium A.

The carriage 13 is disposed to be movable by the carriage moving unit 14 in a main-scanning direction (predetermined direction of the invention; X direction) that intersects the Y direction.

The carriage 13 is connected to the control unit 15 by a flexible circuit 131 and performs a printing process (image formation process on the medium A) with the printing unit 16 and a spectroscopic measurement process with the spectroscope 17 in response to an instruction from the control unit 15.

A detailed configuration of the carriage 13 will be described later.

The carriage moving unit 14 constitutes a moving mechanism of the invention and causes the carriage 13 to reciprocate in the X direction in response to an instruction from the control unit 15.

The carriage moving unit 14 is configured to include, for example, a carriage guide shaft 141, a carriage motor 142, and a timing belt 143.

The carriage guide shaft 141 is arranged in the X direction and has both end portions fixed to, for example, a casing of the printer 10. The carriage motor 142 drives the timing belt 143. The timing belt 143 is supported approximately parallel to the carriage guide shaft 141, and a part of the carriage 13 is fixed thereto. If the carriage motor 142 is driven in response to an instruction of the control unit 15, the timing belt 143 travels in forward and reverse directions, and the carriage 13 fixed to the timing belt 143 reciprocates with guidance by the carriage guide shaft 141.

Next, a configuration of the printing unit 16 and the spectroscope 17 disposed in the carriage 13 will be described on the basis of the drawings.

Configuration of Printing Unit (Image Forming Unit)

The printing unit 16 is an image forming unit of the invention and forms an image on the medium A by discharging inks separately onto the medium A from the part facing the medium A.

Ink cartridges 161 that correspond to a plurality of color inks are mounted on the printing unit 16 in an attachably detachable manner, and ink is supplied from each ink cartridge 161 to an ink tank (not illustrated) through a tube (not illustrated). In addition, nozzles (not illustrated) that discharge ink drops are disposed on the lower face of the printing unit 16 (at a position facing the medium A) in correspondence with each color. Piezoelectric elements, for example, are arranged in the nozzles, and driving of the piezoelectric elements causes ink supplied from the ink tank to be discharged as a drop and to hit the medium A, thereby forming a dot.

Configuration of Spectroscope

Figure 3:
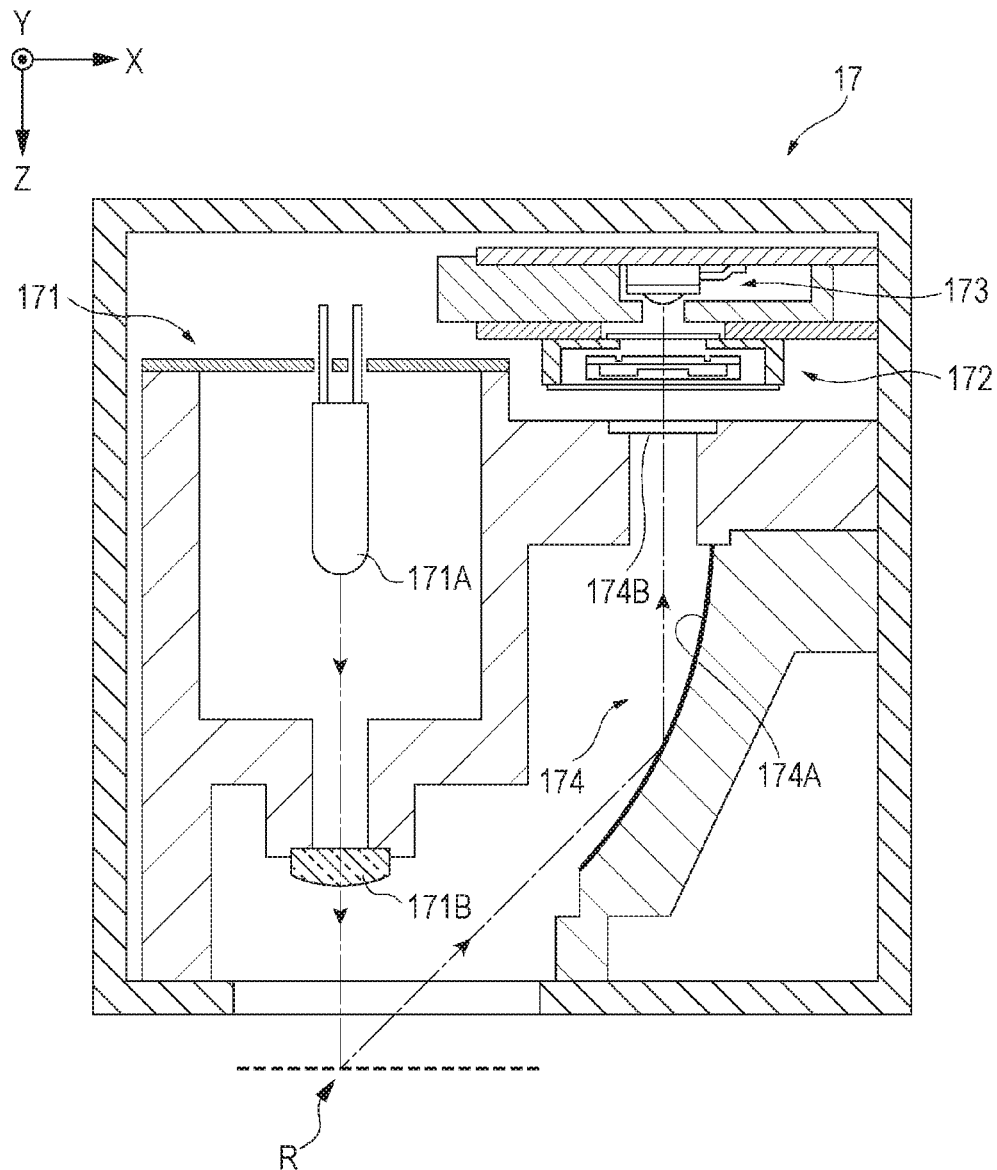
FIG. 3 is a sectional view illustrating a schematic configuration of a spectroscope of the first embodiment.

FIG. 3 is a sectional view illustrating a schematic configuration of the spectroscope 17.

The spectroscope 17 includes a light source unit 171, an optical filter device 172, a light receiver 173, and a light guide unit 174 as illustrated in FIG. 3.

The spectroscope 17 irradiates the medium A with illumination light from the light source unit 171 and causes a light component reflected by the medium A to be incident on the optical filter device 172 by using the light guide unit 174. Then, the optical filter device 172 emits (transmits) light of a predetermined wavelength from the reflective light, and the light receiver 173 receives the emitted light. The optical filter device 172 can select a transmitted wavelength under control of the control unit 15. Measuring the intensity of light of each wavelength in visible light allows spectroscopic measurement of the measurement target region R on the medium A.

Configuration of Light Source Unit

The light source unit 171 includes a light source 171A and a condenser 171B. The light source unit 171 irradiates the measurement target region R of the medium A with light emitted from the light source 171A in the direction of a line normal to the surface of the medium A.

As the light source 171A, it is preferable to use a light source that can emit light of each wavelength in the visible light range. Such a light source 171A can be illustrated by, for example, a halogen lamp, a xenon lamp, and a white LED, and particularly, it is preferable to use a white LED that can be easily installed in a limited space in the carriage 13. The condenser 171B is configured of, for example, a condenser lens and condenses light from the light source 171A in the measurement target region R. While FIG. 3 illustrates only one lens (condenser lens) in the condenser 171B, the condenser 171B may be configured by combining a plurality of lenses.

Configuration of Optical Filter Device

Figure 4:
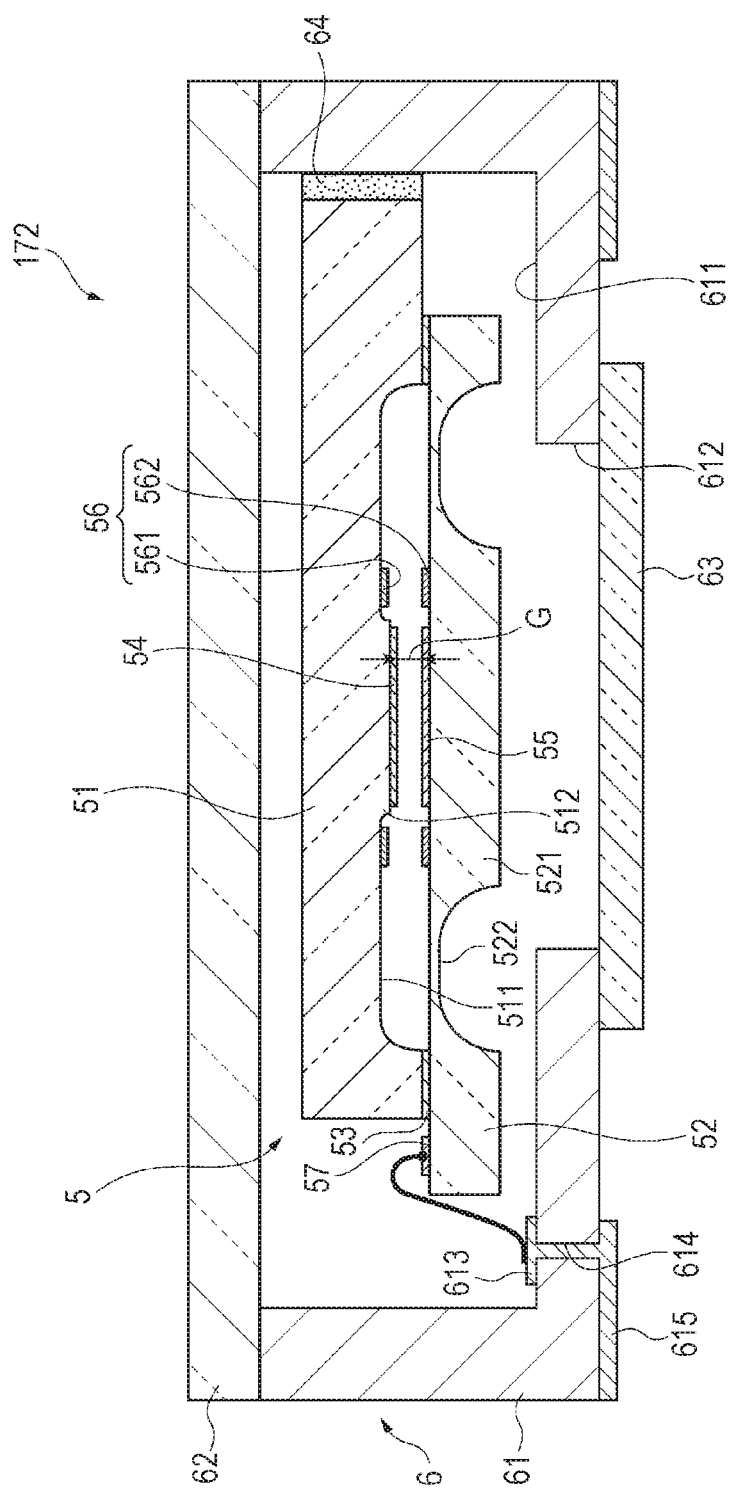
FIG. 4 is a sectional view illustrating a schematic configuration of an optical filter device of the first embodiment.

FIG. 4 is a sectional view illustrating a schematic configuration of the optical filter device 172.

The optical filter device 172 includes a casing 6 and a wavelength-selective interference filter 5 (wavelength-selective interference filter) that is accommodated in the casing 6.

Configuration of Wavelength-Selective Interference Filter

The wavelength-selective interference filter 5 is a wavelength-selective Fabry-Pérot etalon element and includes a light-transmissive fixed substrate 51 and a light-transmissive movable substrate 52 as illustrated in FIG. 4. The fixed substrate 51 and the movable substrate 52 are integrally configured by bonding using a bonding film 53.

The fixed substrate 51 includes a first groove portion 511 that is formed by etching and a second groove portion 512 that is shallower than the first groove portion 511. A fixed electrode 561 is disposed in the first groove portion 511, and a fixed reflecting film 54 is disposed in the second groove portion 512.

The fixed electrode 561, along with a movable electrode 562, constitutes an electrostatic actuator 56 that is a gap changer of the invention. The fixed electrode 561 is formed into, for example, a ring shape surrounding the second groove portion 512 and faces the movable electrode 562 that is disposed in the movable substrate 52.

The fixed reflecting film 54 is configured of, for example, a metal film made of Ag or the like, an alloy film made of an Ag alloy or the like, a dielectric multilayer film made of a laminate of a high-refractive layer and a low-refractive layer, or a laminated body made of a laminate of a metal film (alloy film) and a dielectric multilayer film.

The movable substrate 52 includes a movable portion 521 and a holding portion 522 that is disposed outside of the movable portion 521 to hold the movable portion 521.

The movable portion 521 is formed to have a greater thickness dimension than the holding portion 522. The movable portion 521 is formed to have a greater diametral dimension than the outer circumferential edge of the fixed electrode 561, and the movable electrode 562 and a movable reflecting film 55 are disposed on a face of the movable portion 521 facing the fixed substrate 51.

The movable electrode 562 is disposed at a position facing the fixed electrode 561 and, along with the fixed electrode 561, constitutes the electrostatic actuator 56 which is the gap changer of the invention.

The movable reflecting film 55 is arranged at a position facing the fixed reflecting film 54 through a gap G. As the movable reflecting film 55, a reflecting film having the same configuration as the fixed reflecting film 54 can be used. The fixed reflecting film 54 and the movable reflecting film 55 constitute a pair of reflecting films of the invention.

The holding portion 522 is a diaphragm that surrounds the movable portion 521 and is formed to have a smaller thickness dimension than the movable portion 521. Such a holding portion 522 is more likely to bend than the movable portion 521. Thus, slight electrostatic attraction can displace the movable portion 521 toward the fixed substrate 51. Accordingly, the dimension of the gap G can be changed in a state where parallelism is maintained between the fixed reflecting film 54 and the movable reflecting film 55.

While the holding portion 522 is illustrated as a diaphragm shape in the present embodiment, the present embodiment is not limited to this. For example, it is possible to use a configuration in which beam-shaped holding portions are disposed to be arranged at equiangular intervals around a planar center.

In the peripheral portion of the movable substrate 52 (region not facing the fixed substrate 51), disposed is a plurality of electrode pads 57 that is individually connected to the fixed electrode 561 and to the movable electrode 562.

Configuration of Casing

The casing 6 includes a base 61 and a glass substrate 62 as illustrated in FIG. 4. The base 61 and the glass substrate 62 can be bonded by using, for example, low-melting glass bonding using glass frit (low-melting glass) or adhesion using an epoxy resin or the like. Accordingly, an accommodative space is formed inside the base 61 and the glass substrate 62, and the wavelength-selective interference filter 5 is accommodated in the accommodative space.

The base 61 is configured of, for example, a laminate of ceramic on a thin plate and includes a recessed portion 611 that can accommodate the wavelength-selective interference filter 5. The wavelength-selective interference filter 5 is fixed to, for example, a side face of the recessed portion 611 of the base 61 by a fixing material 64.

A light pass hole 612 is disposed on the bottom face of the recessed portion 611 of the base 61. The light pass hole 612 is disposed to have an overlapping region with the reflecting films 54 and 55 of the wavelength-selective interference filter 5. A cover glass 63 that covers the light pass hole 612 is bonded to the face on the opposite side of the base 61 from the glass substrate 62.

An inside terminal unit 613 is disposed in the base 61 and is connected to the electrode pads 57 of the wavelength-selective interference filter 5. The inside terminal unit 613 is connected through a conductive hole 614 to an outside terminal unit 615 that is disposed outside of the base 61. The outside terminal unit 615 is electrically connected to the control unit 15.

Configuration of Light Receiver and Light Guiding Optical System

Returning to FIG. 3, the light receiver 173 is arranged on the optical axis of the wavelength-selective interference filter 5 and receives light that is transmitted through the wavelength-selective interference filter 5. The light receiver 173 outputs a detection signal (current value) corresponding to the intensity of received light under control of the control unit 15. The detection signal output by the light receiver 173 is input into the control unit 15 through an I-V converter (not illustrated), an amplifier (not illustrated), and an AD converter (not illustrated).

The light guide unit 174 includes a reflecting mirror 174A and a bandpass filter 174B.

Light that is reflected by the measurement target region R at 45° on the surface of the medium A is reflected by the reflecting mirror 174A of the light guide unit 174 onto the optical axis of the wavelength-selective interference filter 5. The bandpass filter 174B transmits light in the visible light range (for example, 380 nm to 720 nm) and cuts ultraviolet light and infrared light. Accordingly, light in the visible light range is incident on the wavelength-selective interference filter 5, and the light receiver 173 receives light of a wavelength in the visible light range selected by the wavelength-selective interference filter 5.

Configuration of Control Unit

The control unit 15 is configured to include an I/F 151, a unit controller circuit 152, a memory 153, and a central processing unit (CPU) 154 as illustrated in FIG. 2.

The I/F 151 inputs into the CPU 154 the print data that is input from the external apparatus 20.

The unit controller circuit 152 includes a controller circuit that controls each of the supply unit 11, the transport unit 12, the printing unit 16, the light source 171A, the wavelength-selective interference filter 5, the light receiver 173, and the carriage moving unit 14 and controls operation of each unit in response to an instruction signal from the CPU 154. The controller circuit for each unit may be disposed separately from the control unit 15 and connected to the control unit 15.

The memory 153 stores various programs and various types of data that control operation of the printer 10.

Various types of data are exemplified by, for example, V-λ data that represents the wavelength of light transmitted through the wavelength-selective interference filter 5 corresponding to the voltage applied to the electrostatic actuator 56 at the time of controlling the wavelength-selective interference filter 5 and printing profile data that stores the amount of each ink to be discharged with respect to color data which is included as the print data. In addition, the memory 153 may store light emitting characteristics (emission spectrum) of the light source 171A with respect to each wavelength, light receiving characteristics (light reception sensitivity characteristics) of the light receiver 173 with respect to each wavelength, and the like.

Figure 5:
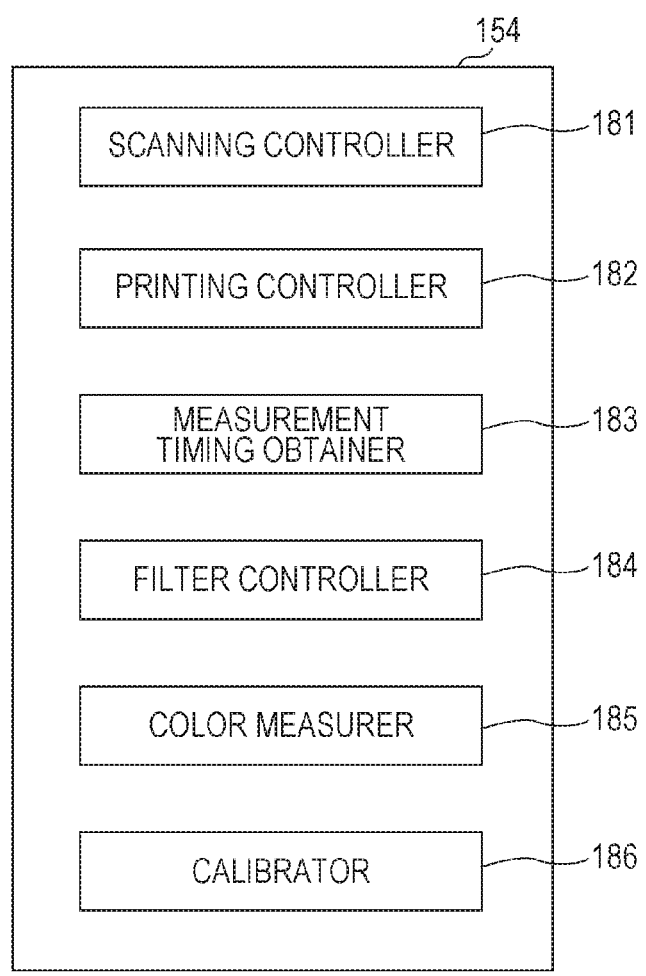
FIG. 5 is a block diagram illustrating a functional configuration of a CPU included in a control unit in the first embodiment.

FIG. 5 is a block diagram illustrating a functional configuration of the CPU included in the control unit 15 of the printer 10.

As illustrated in FIG. 5, the CPU 154 functions as a scanning controller 181, a printing controller 182, a measurement timing obtainer 183, a filter controller 184, a color measurer 185, a calibrator 186, and the like by reading and executing various programs stored on the memory 153.

The scanning controller 181 outputs to the unit controller circuit 152 an instruction signal that indicates driving of the supply unit 11, the transport unit 12, and the carriage moving unit 14. Accordingly, the unit controller circuit 152 drives the roll drive motor of the supply unit 11 and supplies the medium A to the transport unit 12. The unit controller circuit 152 drives the transport motor of the transport unit 12 to transport a predetermined region of the medium A in the Y direction to a position on the platen 122 facing the carriage 13. The unit controller circuit 152 drives the carriage motor 142 of the carriage moving unit 14 to move the carriage 13 in the X direction.

The printing controller 182 outputs to the unit controller circuit 152 an instruction signal that indicates control of the printing unit 16, on the basis of, for example, the print data that is input from the external apparatus 20. In the present embodiment, the printing controller 182 forms the color patch 31 on the medium A on the basis of the preset calibration print data that indicates formation of the color patch 31 in a predetermined color at a predetermined position. The calibration print data may be stored on the memory 153 or may be input from the external apparatus 20.

The color patch 31 will be described in detail later.

If the instruction signal is output to the unit controller circuit 152 from the printing controller 182, the unit controller circuit 152 outputs a printing control signal to the printing unit 16 to drive the piezoelectric element disposed in the nozzle and causes ink to be discharged to the medium A. At the time of performing printing, an image configured of a plurality of dots is printed on the medium A by alternately repeating a dot forming operation that moves the carriage 13 in the X direction and discharges ink from the printing unit 16 during the moving to form a dot and a transport operation that transports the medium A in the Y direction.

The measurement timing obtainer 183 sets a measurement start time for performing spectroscopic measurement in a measurement region M (refer to FIGS. 8A and 8B and FIG. 9) in the color patch 31.

The color patch 31, as described above, is formed on the medium A on the basis of the calibration print data, and the width dimension thereof in the X direction is equal to a predetermined dimension recorded in the calibration print data. In the present embodiment, spectral characteristics of light are obtained from one color patch 31 in a plurality of wavelengths that is present at predetermined intervals in the visible light range (for example, light corresponding to 16 bands from 400 nm to 700 nm at intervals of 20 nm). Therefore, the wavelength-selective interference filter is required to be driven in such a manner to enable detection of light in each of the plurality of wavelengths during movement of the measurement target region R (refer to FIGS. 8A and 8B and FIG. 9) on one color patch 31.

The measurement timing obtainer 183 obtains each of the measurement start time and the measurement end time with respect to the measurement region M within the region of the color patch 31. The measurement start time and the measurement end time may be stored in advance on the memory 153 or may be calculated on the basis of known data.

In a case of calculating the measurement start time and the measurement end time, the measurement timing obtainer 183 sets each of a start position M1 (refer to FIGS. 8A and 8B and FIG. 9) and an end position M2 (refer to FIGS. 8A and 8B and FIG. 9) of the measurement region M within the region of the color patch 31 on the basis of a filter drive time $T_n$ that is required for switching of light transmitted through the wavelength-selective interference filter 5, a number n of types of light to be obtained (number of bands), a speed v of the carriage 13 at the time of movement (uniform linear motion) in the X direction, and a dimension of the color patch (patch width dimension $W_p$). Then, the time (measurement start time) until which a predetermined reference point Rb (refer to FIG. 9) of the measurement target region R moves to the set start position M1 and the measurement end time until which the reference point Rb of the measurement target region R moves to the end position M2 are calculated.

The filter controller 184 controls a wavelength scan performed by the wavelength-selective interference filter 5. That is, the filter controller 184 reads a drive voltage for the electrostatic actuator 56 corresponding to the wavelength of light transmitted through the wavelength-selective interference filter 5 from the V-λ data of the memory 153 and outputs an instruction signal to the unit controller circuit 152. Accordingly, the unit controller circuit 152 applies the drive voltage from the instruction signal to the wavelength-selective interference filter 5, and light of a desired transmitted wavelength is transmitted through the wavelength-selective interference filter 5.

The filter controller 184 switches the voltage applied to the electrostatic actuator 56 when the time elapsing from movement of the carriage 13 by the scanning controller 181 from a predetermined position (reference position) is equal to the measurement start time.

At this time, the filter controller 184 performs a first wavelength scan that changes the drive voltage for the electrostatic actuator 56 in such a manner that the dimension of the gap G between the reflecting films 54 and 55 is gradually (stepwise) decreased. Accordingly, the wavelength of light transmitted through the wavelength-selective interference filter 5 is stepwise switched, and a first spectroscopic measurement process is performed by receiving light of each wavelength using the light receiver 173.

After the first spectroscopic measurement process, the filter controller 184 maintains the drive voltage for the electrostatic actuator 56 at the drive voltage that is last applied in the first spectroscopic measurement process.

If the measurement target region R is moved to the subsequent measurement region M, the filter controller 184 performs a second wavelength scan that changes the drive voltage for the electrostatic actuator 56 in such a manner that the dimension of the gap G is gradually (stepwise) increased. Accordingly, the wavelength of light transmitted through the wavelength-selective interference filter 5 is stepwise switched, and a second spectroscopic measurement process is performed by receiving light of each wavelength using the light receiver 173.

After the second spectroscopic measurement process, the filter controller 184 maintains the drive voltage for the electrostatic actuator 56 at the drive voltage that is last applied in the second spectroscopic measurement process.

The filter controller 184 alternately performing the above first wavelength scan and the second wavelength scan results in alternate performance of the first spectroscopic measurement process and the second spectroscopic measurement process using the spectroscope 17.

The color measurer 185 measures the intensity of color in the color patch 31 on the basis of a spectroscopic measurement result obtained from the measurement region with respect to light of the plurality of wavelengths.

The calibrator 186 corrects (updates) the printing profile data on the basis of a result of color measurement performed by the color measurer 185 and the calibration print data.

Operation of each functional configuration in the control unit 15 will be described in detail later.

Spectroscopic Measurement Method

Next, a spectroscopic measurement method in the printer 10 of the present embodiment will be described on the basis of the drawings.

Figure 6:
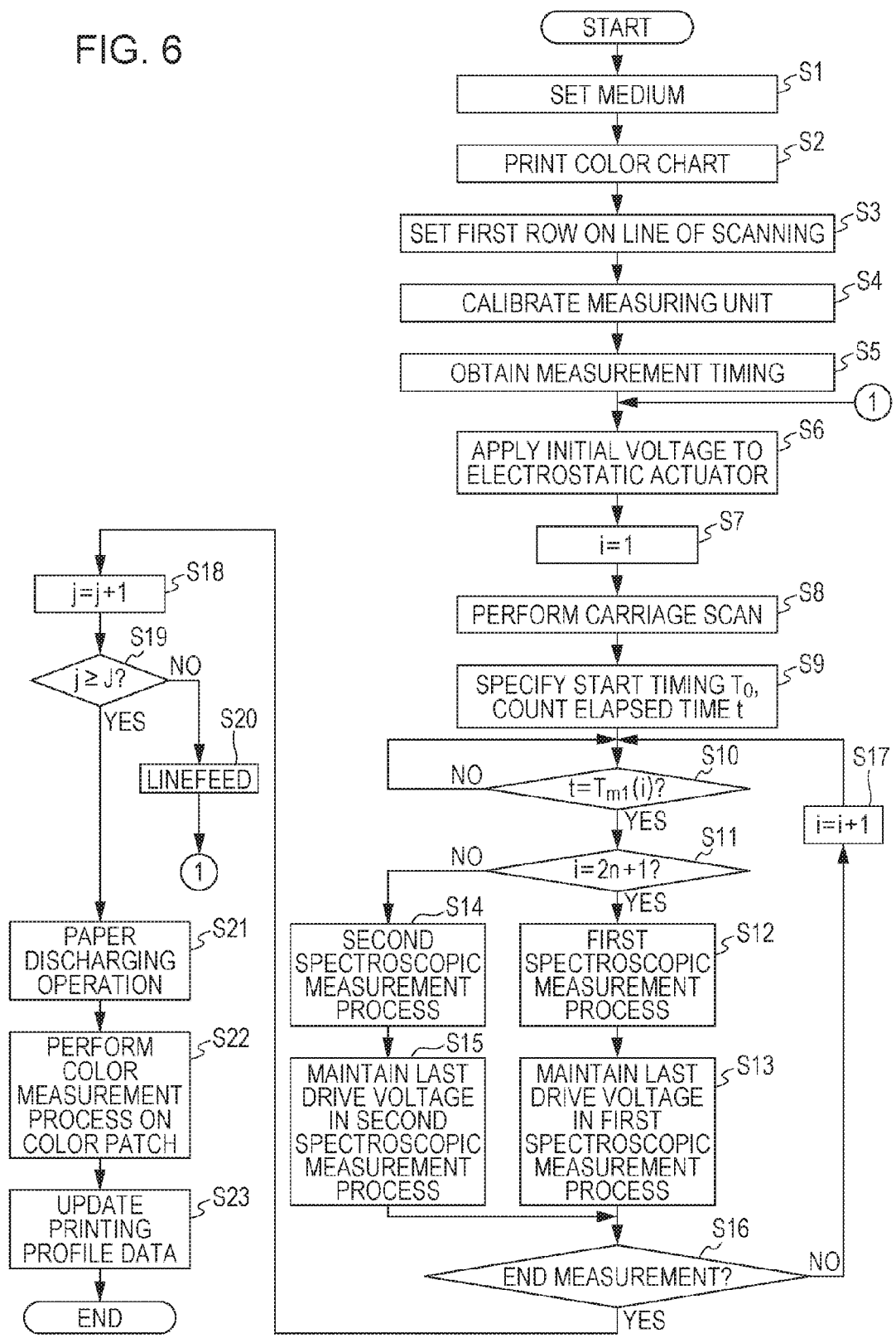
FIG. 6 is a flowchart illustrating a spectroscopic measurement method for the printer of the first embodiment.

FIG. 6 is a flowchart illustrating the spectroscopic measurement method in the printer 10.

The present embodiment illustrates an example in which a measurement target wavelength range is the visible light range from 400 nm to 700 nm and spectroscopic measurement is performed on the basis of the intensity of light in 16 wavelengths that are present at intervals of 20 nm from the initial wavelength of 700 nm.

Formation of Color Chart

In the spectroscopic measurement method for the printer 10, first, a color chart that includes the color patch 31 is formed on the medium A.

In this process, the scanning controller 181 sets the medium A to a predetermined position (Step S1). That is, the scanning controller 181 controls the supply unit 11 and the transport unit 12 to transport the medium A in the sub-scanning direction (+Y direction) and to set a predetermined printing start position of the medium A on the platen 122. The scanning controller 181 moves the carriage 13 to an initial position (for example, a −X side end portion in the main-scanning direction).

The printing controller 182 reads the calibration print data from the memory 153 and prints the color chart on the medium A in synchronization with control of the scanning controller 181 (Step S2).

That is, the scanning controller 181 causes the carriage 13 to scan to the +X side at, for example, a constant speed. The printing controller 182, for example, specifies the position of the printing unit 16 of the carriage 13 according to the time elapsing from the start of the scan and forms a dot at a predetermined position based on the calibration print data by causing ink to be discharged from a predetermined color nozzle (dot forming operation). The scanning controller 181, if the carriage 13 is moved to a +X side end portion, controls the supply unit 11 and the transport unit 12 to transport the medium A in the +Y direction (transport operation). Then, the scanning controller 181 causes the carriage 13 to scan in the −X direction, and the printing controller 182 forms a dot at a predetermined position on the basis of the calibration print data.

Repeating such a dot forming operation and a transport operation forms the color chart on the medium A.

Figure 7:
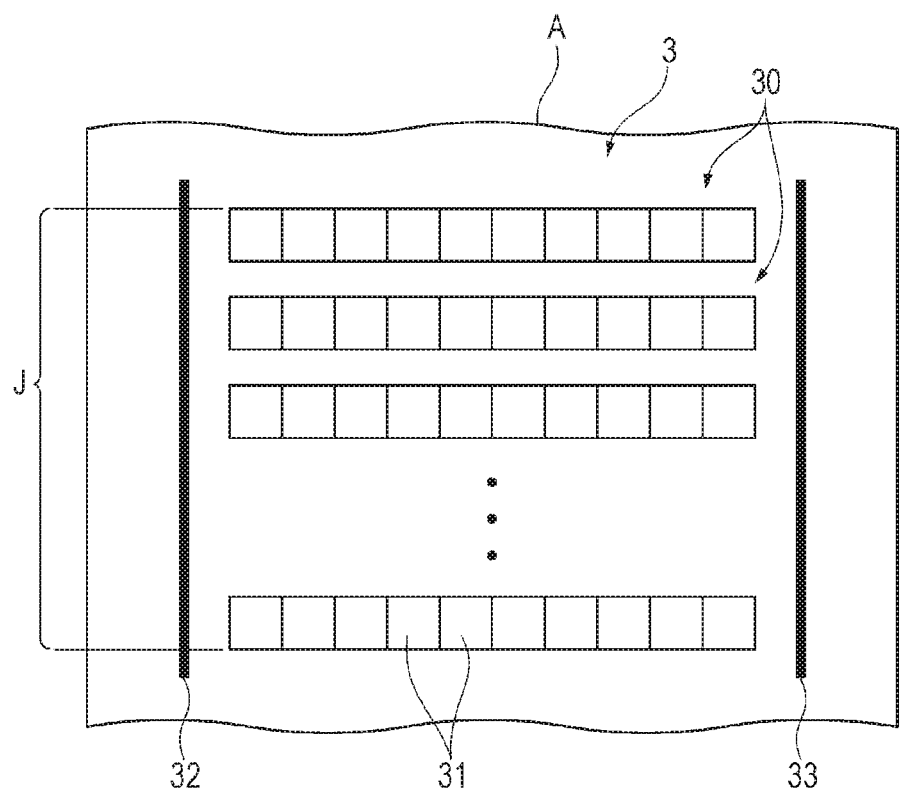
FIG. 7 is a diagram illustrating an example of a color chart in the first embodiment.

FIG. 7 is a diagram illustrating an example of the color chart formed in the present embodiment.

In the present embodiment, a color patch group 30 is configured by arranging the color patches 31 having a plurality of colors in the X direction with no gap therebetween, and a color chart 3 in which the color patch group 30 is arranged in plural quantities in the Y direction is formed by printing as illustrated in FIG. 7. In the color chart 3, a linear start bar 32 parallel to the Y direction is disposed on the −X side of the color patch groups 30, and a linear goal bar 33 parallel to the Y direction is disposed on the +X side of the color patch groups 30. The start bar 32 and the goal bar 33 are formed in a color that has a different reflectance with respect to the initial wavelength from that of the medium A. In the present embodiment, the start bar 32 and the goal bar 33 are formed in black in contrast to the white paper medium A.

Figure 8A:
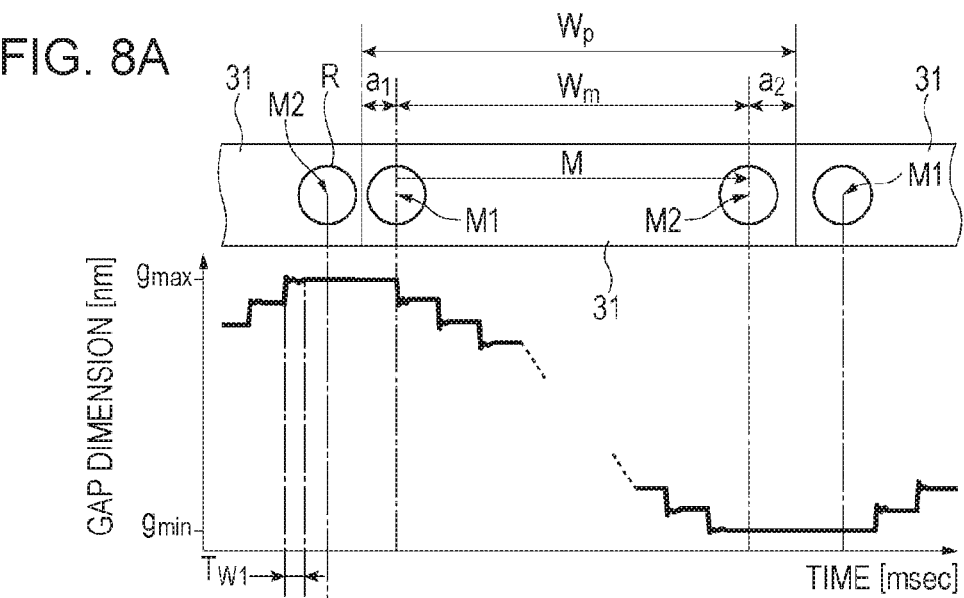
FIG. 8A is a diagram illustrating changes in a gap dimension between reflecting films in the first embodiment.
Figure 8B:
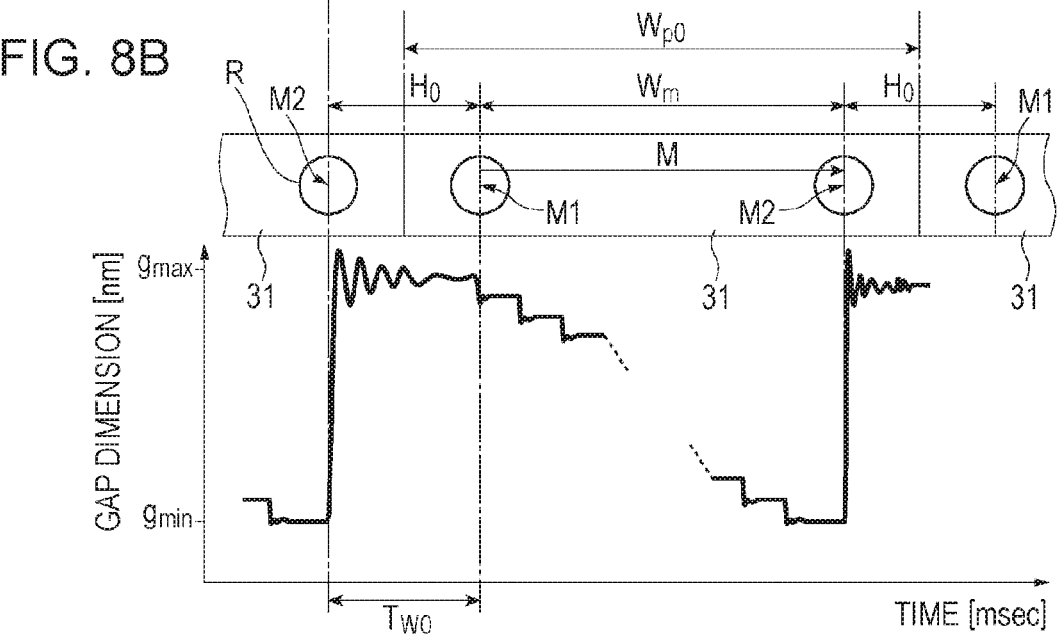
FIG. 8B is a diagram illustrating changes in a gap dimension between reflecting films at a time of scan measurement in the related art.

FIG. 8A is a diagram illustrating changes in the gap dimension between the reflecting films at the time of a scan measurement process in the present embodiment, and FIG. 8B is a diagram illustrating changes in the gap dimension between the reflecting films at the time of a scan measurement process in the related art.

In the present embodiment, the first spectroscopic measurement process that performs spectroscopic measurement while performing the first wavelength scan which stepwise decreases the dimension of the gap G and the second spectroscopic measurement process that performs spectroscopic measurement while performing the second wavelength scan which stepwise increases the dimension of the gap G are alternately performed as illustrated in FIG. 8A.

A minimum gap dimension $g_{min}$ of the gap G is maintained during the period from the end of the first spectroscopic measurement process until the start of the second spectroscopic measurement process. Similarly, a maximum gap dimension $g_{max}$ of the gap G is maintained during the period from the end of the second spectroscopic measurement process until the start of the first spectroscopic measurement process.

In this case, measurement of each color patch 31 can be started early in time compared with, for example, an example of the related art illustrated in FIG. 8B, and the width dimension $W_p$ of each color patch can be decreased.

That is, in the comparative example (example of the related art) illustrated in FIG. 8B, the dimension of the gap G is stepwise decreased in each instance of spectroscopic measurement, and if the spectroscopic measurement ends, the dimension of the gap G returns to a predetermined initial gap (maximum gap dimension $g_{max}$). Thus, the movable reflecting film 55 vibrates with a comparatively large vibration amplitude due to elasticity of the movable portion 521. As a consequence, spectroscopic measurement of the subsequent color patch 31 cannot be performed during a wait time period $T_{W0}$ until which the vibration stops. Accordingly, in a case of a uniform linear motion of the carriage 13 at the speed v, at least a distance $H_0$ of (wait time period $T_{W0}$)×(speed v of the carriage 13) is required between the end position of spectroscopic measurement of an i-th color patch 31 and the start position of spectroscopic measurement of an (i+1)-th color patch 31, and the value of a width dimension $W_{p0}$ of each color patch 31 is increased.

Regarding this matter, in the present embodiment, the dimension of the gap G is not significantly changed after the end of the first spectroscopic measurement process and the second spectroscopic measurement process as illustrated in FIG. 8A, and a wait time period $T_{W1}$ is significantly smaller than the wait time period $T_{W0}$ of the related art. Thus, it is not necessary to take into account a wait period time as in the related art for the distance from the end position of spectroscopic measurement of the i-th color patch 31 to the start position of spectroscopic measurement of the (i+1)-th color patch 31, and margins $a_1$ and $a_2$ ($a_1+a_2<H_0$) may be set in order to allow shifting of the measurement start position or the measurement end position with respect to the color patches 31 due to vibrations or the like in the carriage 13.

Initial Setting

Returning to FIG. 6, the scanning controller 181, if ink of the printed color chart 3 dries after Step S2, controls the transport unit 12 to transport the medium A in a −Y direction and to position the first row of the color patches 31 on the line of scanning facing the carriage 13 (measurement target region R) (Step S3).

In the description below, the color patches 31 are arranged into J rows in the Y direction, and a measurement target row number in the color patches 31 is indicated by a variable j (where j is an integer from 1 to J). Since the variable j is set to one in Step S3, the scanning controller 181 transports the medium A in such a manner that the first row color patch group 30 is positioned on the platen 122. In addition, in Step S3, the scanning controller 181 moves the carriage 13 to the −X side end portion (initial position X=0).

After Step S3, a calibration process is performed on the spectroscope 17 (Step S4).

Figure 9:
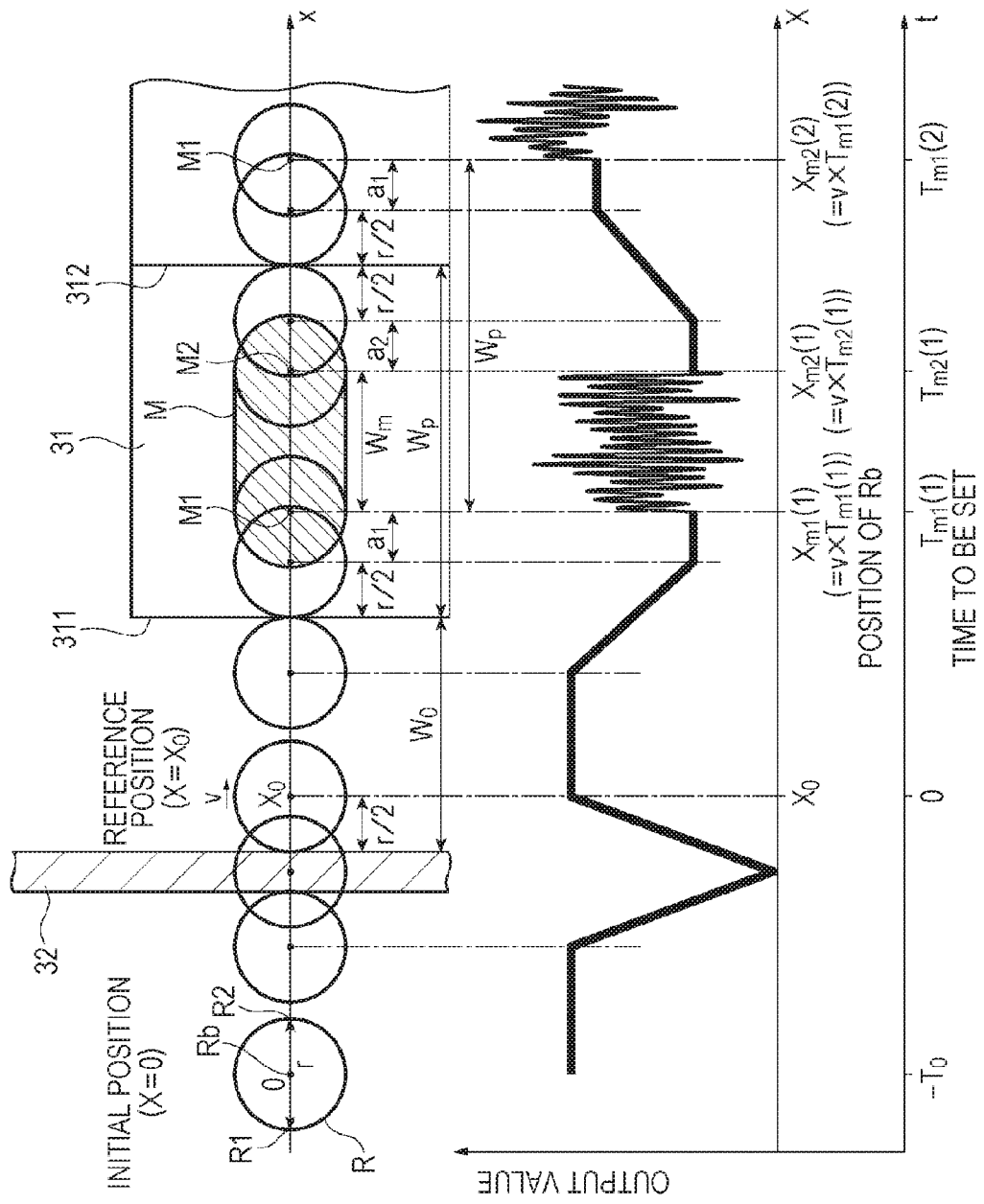
FIG. 9 is a diagram illustrating a relationship among a position of a measurement target region with respect to a color patch, a change in output value, and the time of movement of a carriage in the first embodiment.

FIG. 9 is a diagram illustrating a relationship among the position of the measurement target region with respect to the color patch, a change in output value, and the time of movement of the carriage. The carriage 13 is positioned at the initial position in the −X side end portion after Step S3. Thus, the measurement target region R is positioned further to the −X side than the start bar 32 as illustrated in FIG. 9.

In a case of using white paper as the medium A, the control unit 15 performs spectroscopic measurement of the white paper at the initial position. That is, the control unit 15 turns on the light source 171A, causes the filter controller 184 to sequentially change the drive voltage applied to the electrostatic actuator 56 of the wavelength-selective interference filter 5, and obtains the output value of the light receiver 173 in each of n bands (for example, 16 bands) that are present at intervals of 20 nm from the initial wavelength. The control unit 15 measures the output value (dark voltage) in a state where light is not incident on the light receiver 173. In this process, the output value from the light receiver 173 may be obtained in a state where, for example, the light source 171A is turned off, or the output value from the light receiver 173 may be obtained after, for example, disposing a light blocking plate advanceable and retractable on the optical path in the light guide unit 174 of the spectroscope 17 and blocking incidence of light on the light receiver 173 by using the light blocking plate.

The color measurer 185 performs the calibration process on the spectroscope 17 on the basis of a spectrum of the white paper and the dark voltage. That is, a reference intensity of light (reference output value) is obtained in each wavelength in a case where light from the light source 171A is reflected by the medium A. In the above example, given that the output value in a wavelength $\lambda$ at the time of measuring the white paper is $Vw(\lambda)$ and that the dark voltage is Vd, a reference output value $V_{ref}(\lambda)$ in the wavelength $\lambda$ is calculated from $V_{ref}(\lambda)=Vw(\lambda)-Vd$.

While the present embodiment illustrates the medium A as white paper, the medium A may have other colors. In this case, since the color (reflectance in each wavelength) of the medium A is known, the reference output value can be calculated from the output value in each wavelength at the time of calibration. A white color patch as a reference color may be formed on the –X side of the start bar 32 at the time of forming the color chart 3. In this case, if the white color is produced by using an ink pigment, the white color patch having a known reflectance can be formed independently of the medium A.

In Step S4, calibration of the wavelength-selective interference filter 5 may be performed in addition to obtainment of the reference output value $V_{ref}(\lambda)$ that is used at the time of spectroscopic measurement.

That is, since the light emitting characteristics of the light source 171A and the light reception sensitivity characteristics of the light receiver 173 are known, a shift between the transmitted wavelength corresponding to the applied voltage based on the V-$\lambda$ data and the transmitted wavelength corresponding to the actually applied voltage can be detected by comparing spectral characteristics resulting from multiplication of the light emitting characteristics of the light source 171A and the light reception sensitivity characteristics of the light receiver 173 with the waveform of the output value in Step S4. In this case, the wavelength-selective interference filter 5 can be calibrated by, for example, correcting the V-$\lambda$ data on the basis of a measurement result.

A correction color patch having a higher reflectance or absorbance in a predetermined wavelength (for example, the initial wavelength of 700 nm) than in other wavelengths may be formed at the initial position on the medium A. For example, in a case of arranging a correction color patch having a high reflectance only in the initial wavelength, spectroscopic measurement is performed in each wavelength, a determination of whether a voltage at which the peak of the reflectance (initial wavelength) is detected matches the voltage corresponding to the initial wavelength recorded in the V-$\lambda$ data is performed, and, if a shift is present between the voltages, the V-$\lambda$ data is corrected.

Measurement Timing Setting Process

After Step S4, the control unit 15 obtains the measurement timing (measurement start time and measurement end time) for measurement of each color patch 31 of the color patch groups 30 of the color chart 3 (Step S5).

Since the color chart 3 is formed on the basis of the calibration print data and the speed v of movement of the carriage 13 is known, the measurement start time and the measurement end time corresponding to each color patch 31 of the color chart 3 may be stored in advance on the memory 153. In this case, the measurement start time and the measurement end time stored on the memory 153 are read in Step S4.

The measurement region M, the measurement start time, and the measurement end time may be calculated on the basis of the calibration print data and the speed v of movement of the carriage 13.

Hereinafter, an example of a calculation method will be described in a case of calculating the measurement region M, the measurement start time, and the measurement end time.

In the description below, the –X side end portion (minus side end portion) of one color patch 31 in the X direction will be referred to as a first patch end portion 311 and the +X side end portion (plus side end portion) thereof as a second patch end portion 312 as illustrated in FIG. 9. In the present embodiment, the first patch end portion 311 of the i-th color patch 31 in the color patch groups 30 matches the second patch end portion 312 of the (i–1)-th color patch 31, and the second patch end portion 312 of the i-th color patch 31 matches the first patch end portion 311 of the (i+1)-th color patch 31. In the present embodiment, the measurement target region R is a circular spot of a diameter r (measurement width dimension r), and the –X side end portion thereof is referred to as a first measurement region end portion R1 and the +X side end portion thereof as a second measurement region end portion R2. In the present embodiment, the reference point Rb is set to the center of the circle in the measurement target region R.

The color chart 3 is an image formed on the basis of the calibration print data, and as illustrated in FIG. 9, a distance $W_0$ from the start bar 32 to the first color patch and the width dimension (patch width dimension $W_p$) of each color patch 31 in the X direction are set to known values in the color chart 3 printed on the medium A.

In the present embodiment, the scanning controller 181 causes the carriage 13 to scan in the X direction in a uniform motion (at the speed v).

The time (filter drive time) $T_n$ from application of the drive voltage to the electrostatic actuator 56 of the wavelength-selective interference filter 5 until transmission of light of the transmitted wavelength corresponding to the drive voltage can be obtained by measuring the time $T_n$ in advance at the time of, for example, inspecting the wavelength-selective interference filter. Therefore, the time that is required for obtaining the intensity of light (output value) corresponding to n bands is equal to $n \times T_n$, and a measurement distance $W_m$ (refer to FIG. 9) in which the measurement target region R moves in the X direction during the time is equal to $W_m = v \times (n \times T_n)$. In actual performance of color measurement, the measurement target region R is required to be included within the region of the color patch 31 during movement thereof in the measurement distance $W_m$. Thus, the measurement region M is required to satisfy at least the following Expression (1).

$$r + W_m < W_p \tag{1}$$

A slight shift in the measurement region causes either the start position or the end position of the measurement region to be deviated outside of the color patch 31 if the start position of the measurement region M is set to the position at which the first patch end portion 311 of the color patch 31 matches the first measurement region end portion R1 (position at which the reference point Rb is separated from the first patch end portion 311 by +r/2) and the end portion of the measurement region M is set to the position at which the second patch end portion 312 matches the second measurement region end portion R2 (position at which the reference point Rb is separated from the second patch end portion 312 by −r/2). In this case, spectroscopic measurement of the color patch 31 cannot be accurately performed.

Therefore, in the present embodiment, the measurement region M is set in such a manner that the start position M1 is set to the position separated to the +X side by the predetermined margin $a_1$ (first distance) from the position at which the first measurement region end portion R1 overlaps with the first patch end portion 311 and that the end position M2 is set to the position separated to the −X side by the predetermined margin $a_2$ (second distance) from the position at which the second measurement region end portion R2 overlaps with the second patch end portion 312.

Therefore, the measurement timing obtainer 183 sets the margins $a_1$ and $a_2$ in such a manner to satisfy the following Equation (2) and sets the measurement region M. The margins $a_1$ and $a_2$ are preferably the same value. In actual performance of spectroscopic measurement, the direction in which the measurement region M moves cannot be predicted. Thus, setting the margins $a_1$ and $a_2$ to the same value on the +X side and the −X side allows an increase in the reliability of the spectroscopic measurement.

$$r+(a_1+a_2)+W_m=W_p \tag{2}$$

The margins satisfy the relationship of $a_1+a_2<H_0$ and are smaller than the distance $H_0$ that corresponds to the wait time period for the stoppage of vibration in the reflecting films 54 and 55 as described above.

In the present embodiment, the carriage 13 accelerates in an accelerated linear motion from the initial position (X=0) to the start bar 32, then moves in the +X direction in a uniform linear motion at the speed v, and decelerates in an accelerated linear motion and stops after passing the goal bar 33.

Thus, the position of the measurement target region R can be detected by using the time of movement of the carriage 13 in a uniform linear motion at the speed v from the reference position corresponding to the timing at which the measurement target region R passes the start bar 32. That is, in the present embodiment, the measurement timing obtainer 183 calculates the time (measurement start time) until which the reference point Rb of the measurement target region R moves to the start position M1 of each color patch 31 for setting of the measurement region M. The measurement timing obtainer 183 may further calculate the time (measurement end time) until which the reference point Rb moves to the end position M2 of each color patch 31.

To describe more specifically, if the wavelength in which light is transmitted through the wavelength-selective interference filter 5 is fixed to a constant wavelength (for example, the initial wavelength of 700 nm), the output value from the light receiver 173 gradually decreases after the second measurement region end portion R2 of the measurement target region R reaches the start bar 32 as illustrated in FIG. 9. The output value has the minimum value when the reference point Rb passes the center of the start bar 32, and then, the output value increases again and returns to the original output value (for example, the output value corresponding to the white paper) at the timing ($T=T_0$) when the first measurement region end portion R1 matches the +X side end portion of the start bar. Therefore, the reference timing $T_0$ corresponding to the reference position can be easily detected on the basis of the waveform of the output value.

The distance from the reference position to the start position M1 of the initial color patch 31 is equal to "$W_0+a_1$" as illustrated in FIG. 9. Therefore, a time (measurement start time) $T_{m1}(1)$ of movement (of the reference point Rb) from the reference timing $T_0$ to the start position M1 in the initial color patch 31 is represented by Equation (3) below. In a case of calculating a time (measurement end time) $T_{m2}(1)$ of movement from the reference timing $T_0$ to the end position M2, the following Equation (4) may be used.

$$T_{m1}(1)=(W_0+a_1)/v \tag{3}$$

$$T_{m2}(1)=T_{m1}(1)+W_m/v=(W_0+a_1+W_m)/v \tag{4}$$

If the patch width dimension $W_p$ is the same for each color patch 31, the start position M1 and the end position M2 of the i-th (where i≥2) color patch 31 correspond to the positions moved to the +X side from the start position M1 and the end position M2 of the (i−1)-th color patch 31 by the patch width dimension $W_p$ of each color patch 31. Thus, the times of movement from the position corresponding to the reference timing $T_0$ to the start position M1 and to the end position M2 of the i-th (where i≥2) color patch 31 are respectively represented by the following Equation (5) and Equation (6).

$$T_{m1}(i)=T_{m1}(i-1)+W_p/v \tag{5}$$

$$T_{m2}(i)=T_{m1}(i)+W_m/v(=T_{m2}(i-1)+W_p/v) \tag{6}$$

(where i≥2)

If the dimension of each color patch 31 is different, the margins $a_1(i)$ and $a_2(i)$ are set in such a manner to satisfy Equation (7) below for the i-th color patch 31 having the patch width dimension $W_p(i)$. Even in this case, the margins $a_1(i)$ and $a_2(i)$ are preferably set to the same value.

$$r+(a_1(i)+a_2(i))+W_m=W_p(i) \tag{7}$$

The measurement timing obtainer 183 calculates the measurement start time $T_{m1}(i)$ and the measurement end time $T_{m2}(i)$ on the basis of the following Equation (8) and Equation (9) in order to move the reference point Rb from the reference position X0 to the start position M1 and to the end position M2 of the i-th color patch 31.

$$T_{m1}(i)=T_{m1}(i-1)+(r+W_m+a_2(i-1)+a_1(i))/v(=T_{m2}(i-1)+(r+a_2(i-1)+a_1(i))/v) \tag{8}$$

$$T_{m2}(i)=T_{m2}(i-1)+(r+a_2(i-1)+a_1(i)+W_m)/v(=T_{m1}(i)+W_m/v) \tag{9}$$

(where i≥2)

Scan Measurement Process

After Step S5, a scan measurement process. illustrated below is performed.

FIG. 10 is a diagram illustrating a measurement wavelength, a measurement ordinal number, the dimension of the gap G, and a change in the dimension in spectroscopic measurement of each of two contiguous color patches in the present embodiment.

In the scan measurement process, the filter controller 184 sets the voltage applied to the electrostatic actuator 56 of the wavelength-selective interference filter 5 to an initial drive voltage (Step S6). The initial drive voltage is a drive voltage corresponding to the measurement wavelength in which the first color patch 31 is initially measured and is stored in, for example, the V-λ data stored on the memory 153. For example, in the example illustrated in FIG. 10, the wavelength in which measurement is performed for "1" in the measurement order is "600 (nm)", and the gap dimension is set to "523.2 (nm)" in spectroscopic measurement of the color patch corresponding to i=1. Therefore, for the initial drive voltage, a drive voltage corresponding to the gap dimension of "523.2 (nm)" is read from the V-λ data and is applied to the electrostatic actuator 56.

The filter controller 184 initializes a variable i that indicates the position of the color patch 31 (i=1) (Step S7).

Then, the scanning controller 181 moves the carriage 13 in the X direction (Step S8; moving step). The control unit 15 obtains the output value from the light receiver 173 in predetermined sampling cycles and stores the output value on the memory 153. The filter controller 184 monitors the sampled output value, specifies the reference timing $T_0$, and counts an elapsed time t from the reference timing $T_0$ (Step S9).

The filter controller 184 determines whether the elapsed time t from the reference timing $T_0$ is equal to the measurement start time $T_{m1}(i)$ obtained in Step S5 (Step S10).

If Step S10 is determined as "No", the process waits until the elapsed time t is equal to the measurement start time $T_{m1}(i)$ (movement of the carriage 13 continues).

If Step S10 is determined as "Yes", the control unit 15 performs a spectroscopic measurement process on the measurement region M that is set in the i-th color patch 31.

Specifically, a determination of whether the variable i indicating a color patch is an odd number (i=2n+1; where n is an integer greater than or equal to zero) is performed (Step S11).

If Step S11 is determined as "Yes", the first spectroscopic measurement process is performed (Step S12; first spectroscopic measurement step).

In the first spectroscopic measurement process, the filter controller 184 stepwise decreases the dimension of the gap G as illustrated in FIG. 10 by stepwise increasing the voltage applied to the electrostatic actuator 56 (first wavelength scan). Accordingly, the output values corresponding to light of n bands in a predetermined wavelength range (for example, 16 output values corresponding to light of wavelengths that are present at intervals of 20 nm from 400 nm to 700 nm) are output from the light receiver 173 to the control unit 15. The control unit 15 appropriately stores these output values on the memory 153.

By changing the dimension of the gap G gradually (stepwise) as described above, the size of a change in the gap is decreasing, and vibrations at the time of displacing the movable portion 521 can be suppressed. That is, since the filter drive time $T_n$ that is required for switching of light transmitted through the wavelength-selective interference filter 5 can be decreased, the measurement region M can be reduced.

After the first spectroscopic measurement process, the filter controller 184 maintains the drive voltage that corresponds to the wavelength in which measurement is last performed in the first spectroscopic measurement process (Step S13). That is, the dimension of the gap G is maintained at the dimension that is last set in the first wavelength scan (in the example of FIG. 10, 234.9 (nm)).

Meanwhile, if Step S11 is determined as "No" (if the variable i indicating a color patch is an even number (i=2n)), the second spectroscopic measurement process is performed (Step S14; second spectroscopic measurement step).

In the second spectroscopic measurement process, the filter controller 184 stepwise increases the dimension of the gap G as illustrated in FIG. 10 by stepwise decreasing the voltage applied to the electrostatic actuator (second wavelength scan). Accordingly, the output values corresponding to light of n bands in a predetermined wavelength range (for example, 16 output values corresponding to light of wavelengths that are present at intervals of 20 nm from 400 nm to 700 nm) are output from the light receiver 173 to the control unit 15. The control unit 15 appropriately stores these output values on the memory 153.

After the second spectroscopic measurement process, the filter controller 184 maintains the drive voltage that corresponds to the wavelength in which measurement is last performed in the second spectroscopic measurement process (Step S15). That is, the dimension of the gap G is maintained at the dimension that is last set in the second wavelength scan (in the example of FIG. 10, 523.2 (nm)).

After Step S13 and Step S15, the control unit 15 determines whether the spectroscopic measurement process is completed on all of the color patches 31 in the color patch group 30 arranged in the j-th row (Step S16). In this process, the number of times the spectroscopic measurement process is performed may be counted, and a determination of whether the counted number is equal to a total number I of color patches 31 arranged in the color patch group 30 may be performed. Alternatively, a determination of whether the carriage 13 passes the goal bar 33 may be performed.

If Step S16 is determined as "No", the variable i is incremented by "1" (Step S17), and the process returns to Step S10.

That is, in the present embodiment, the first spectroscopic measurement process for the odd color patches 31 and the second spectroscopic measurement process for the even color patches 31 are alternately performed. Thus, a rapid change in the dimension of the gap G is suppressed as illustrated in FIG. 8A, and as a consequence, the wait time period is decreased.

Meanwhile, if Step S16 is determined as "Yes", the scanning controller 181 increments the variable j by "1" (Step S18) and determines whether the variable j is greater than or equal to the maximum value J that corresponds to the last row color patch group 30 (Step S19).

If Step S19 is determined as "No", the scanning controller 181 performs a linefeed process and transports the medium A in such a manner to position the j-th row color patch group 30 on the platen 122 (Step S20). Then, the process returns to Step S6.

Color Measurement Process and Profile Update Process

If Step S19 is determined as "Yes", the scanning controller 181 controls the transport unit 12 to perform a paper discharging operation and discharges the medium A (Step S21).

The color measurer 185 calculates the reflectance of each color patch in each wavelength on the basis of the output value in each wavelength obtained for each color patch and the reference output value $V_{ref}(\lambda)$ obtained in Step S4 (Step S22). That is, the color measurer 185 performs a color measurement process on each color patch and calculates the intensity of color.

Then, the calibrator 186 updates the printing profile data stored on the memory 153 on the basis of the intensity of color of each color patch recorded in the calibration print data and the intensity of color calculated in Step S22 (Step S23).

Effect of Present Embodiment

The printer 10 of the present embodiment performs spectroscopic measurement of the color patches 31 by changing the dimension of the gap G in the wavelength-selective interference filter 5 disposed in the spectroscope 17 while moving the carriage 13 including the spectroscope 17 and the printing unit 16 in the X direction. At this time, the printer 10 alternately performs the first spectroscopic measurement process and the second spectroscopic measurement process.

That is, in the first spectroscopic measurement process, the dimension of the gap G is stepwise changed in the range corresponding to the measurement target wavelength range, from the maximum gap dimension (523.2 (nm)) down to the minimum gap dimension (234.9 (nm)), and then is maintained at the minimum gap dimension without returning to the maximum gap dimension. In the subsequent second spectroscopic measurement process, the dimension of the gap G is stepwise changed from the minimum gap dimension to the maximum gap dimension and then is maintained at the maximum gap dimension. Therefore, vibrations in the reflecting films are reduced at the end of the first spectroscopic measurement process and the second spectroscopic measurement process, and the wait time period related to the stoppage of the vibrations can be decreased. Accordingly, the total amount of time related to the scan measurement process can be significantly decreased.

In addition, various subsequent processes can be started early by the amount of time corresponding to a decrease in the time related to the spectroscopic measurement process performed on each color patch 31. That is, the total amount of time related to the spectroscopic measurement process performed on each color patch 31, the color measurement process performed in accordance with the spectroscopic measurement result, and the calibration process from the formation of the color chart 3 performed by the printing unit 16 can be decreased.

In the present embodiment, the first spectroscopic measurement process is performed on the odd color patches 31, and the second spectroscopic measurement process is performed on the even color patches. That is, the first spectroscopic measurement process and the second spectroscopic measurement process are switched each time the spectroscopic measurement target color patch 31 is switched.

Thus, performing the first spectroscopic measurement process or the second spectroscopic measurement process on one color patch 31 allows the color measurement process to be accurately performed on each color patch 31.

The width dimension $W_p$ of each color patch 31 can be set on the basis of the width dimension of the measurement region M related to the first spectroscopic measurement process or the second spectroscopic measurement process in such a manner that the first spectroscopic measurement process or the second spectroscopic measurement process is performed when the position of measurement performed by the spectroscope 17 (measurement target region R) is positioned within the color patch 31. That is, as described above, since the wait time period for waiting for the stoppage of vibrations in the movable portion 521 can be decreased in the present embodiment, the wait time period is not required to be taken into account in the formation of the color patches 31 performed by the printing unit 16, and the width dimension $W_p$ of each color patch 31 can be smaller than that in the related art.

Thus, the number of color patches 31 arranged in one row can be increased, and the number of rows of the color patch groups 30 included in the color chart 3 can be decreased. From this point, the amount of time related to movement of the carriage 13 to the initial position and the transport operation for the medium A can be decreased, and the total amount of time related to the scan measurement process is decreased.

For example, consider a case of forming six rows of the color patch groups 30, each in which 10 color patches 31 are arranged, and performing spectroscopic measurement of 60 color patches 31 in the related art. In the present embodiment, as described above, decreasing the width dimension $W_p$ of each color patch 31 allows an increase in the number of color patches 31 belonging to one color patch group 30 in which 12 color patches 31, for example, can be included. In this case, five rows of the color patch groups 30 may be formed in order to measure the 60 color patches 31, and the movement of the carriage 13 to the initial position and the transport operation for the medium A can be reduced in time by the amount corresponding to one row.

Second Embodiment

Next, a second embodiment according to the invention will be described. In the description below, the same configurations and processes as in the first embodiment will be designated by the same reference sign, and descriptions thereof will not be provided or will be simplified.

While the first embodiment illustrates the carriage 13 as being moved in a uniform linear motion at the speed v of movement, the second embodiment is different from the first embodiment in that the speed v of movement of the carriage 13 is changed during scanning.

Figure 11:
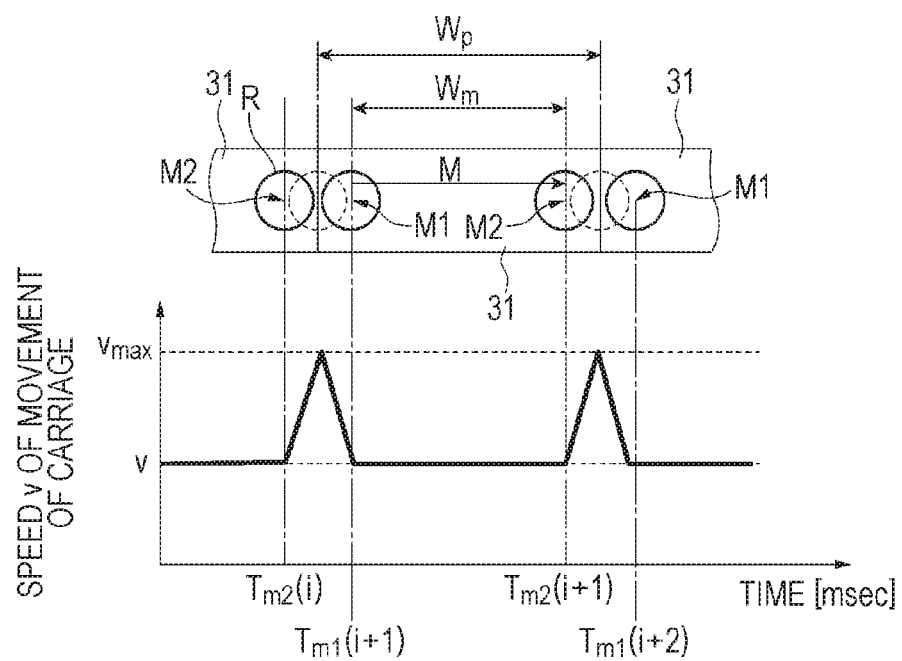
FIG. 11 is a diagram illustrating a relationship among a plurality of color patches, a position of a measurement target region with respect to the color patches, and the speed of movement of a carriage in a second embodiment.

FIG. 11 is a diagram illustrating a relationship among a plurality of color patches, the position of the measurement target region with respect to the color patches, and the speed of movement of the carriage in the second embodiment.

In the present embodiment, the first spectroscopic measurement process and the second spectroscopic measurement process are alternately performed in the scan measurement process as in the first embodiment. In addition, as in the first embodiment, the dimension of the gap G is maintained at the dimension (234.9 (nm)) that is set in the last measurement performed in the first spectroscopic measurement process, during the period from the end of the first spectroscopic measurement process until the start of the subsequent second spectroscopic measurement process. Similarly, the dimension of the gap G is maintained at the dimension (523.3 (nm)) that is set in the last measurement performed in the second spectroscopic measurement process, during the period from the end of the second spectroscopic measurement process until the start of the subsequent first spectroscopic measurement process.

In the present embodiment, as illustrated in FIG. 11, the speed of movement of the carriage 13 is set to a speed (second speed) that is greater than the speed v of movement at the time of the first spectroscopic measurement process and the second spectroscopic measurement process, during the non-measurement period from the end of the first spectroscopic measurement process until the start of the subsequent second spectroscopic measurement process and the non-measurement period from the end of the second spectroscopic measurement process until the start of the subsequent first spectroscopic measurement process.

That is, the scanning controller 181 accelerates the carriage 13 at a predetermined acceleration α during the period in which the measurement target region R moves from the end position M2 of the measurement region M in the i-th color patch 31 to the position at which the reference point Rb overlaps with a boundary between the color patches 31 (i-th second patch end portion 312 and (i+1)-th first patch end portion 311). The scanning controller 181 decelerates the carriage 13 at a predetermined acceleration α during the period in which the measurement target region R moves from the position at which the reference point Rb overlaps with the boundary between the color patches 31 to the start position M1 of the measurement region M in the (i+1)-th color patch 31 and causes the speed of the carriage 13 to return to the speed v (first speed and third speed) of movement at the time of spectroscopic measurement.

Specifically, the scanning controller 181 moves the carriage 13 at a speed $V=v+\alpha\{t-T_{m2}(i)\}$ during the period in which the elapsed time t changes from $T_{m2}(i)$ to $\{T_{m1}(i+1)-T_{m2}(i)\}/2$, on the basis of the measurement end time $T_{m2}(i)$ with respect to the i-th color patch 31 and the measurement start time $T_{m1}(i+1)$ with respect to the (i+1)-th color patch 31.

The scanning controller 181 moves the carriage 13 at the speed $V=v-\alpha\{T_{m1}(i+1)-t\}$ during the period in which the elapsed time t changes from $\{T_{m1}(i+1)-T_{m2}(i)\}/2$ to $T_{m1}(i+1)$.

Effect of Present Embodiment

In the present embodiment, the speed V of movement of the carriage 13 is set to be greater than the speed v of movement at the time of spectroscopic measurement process during the period (period between the first spectroscopic measurement process and the second spectroscopic measurement process) in which the measurement target region R moves between adjacent color patches 31 and the spectroscopic measurement process is not performed on the color patches 31.

Accordingly, the measurement target region R can be promptly moved to the start position M1 of measurement of the (i+1)-th color patch 31 after the end of the spectroscopic measurement process (first spectroscopic measurement process or second spectroscopic measurement process) performed on the i-th color patch 31, and the total amount of time of the scan measurement process can be further decreased.

Third Embodiment

Next, a third embodiment according to the invention will be described on the basis of the drawings.

The first and second embodiments illustrate an example in which one measurement region M is set for one color patch 31 and the spectroscopic measurement process (first spectroscopic measurement process or second spectroscopic measurement process) is performed on the measurement region M. Regarding this matter, the third embodiment is different from the above embodiments in that the spectroscopic measurement process is performed a plurality of times on one color patch 31.

Figure 12A:
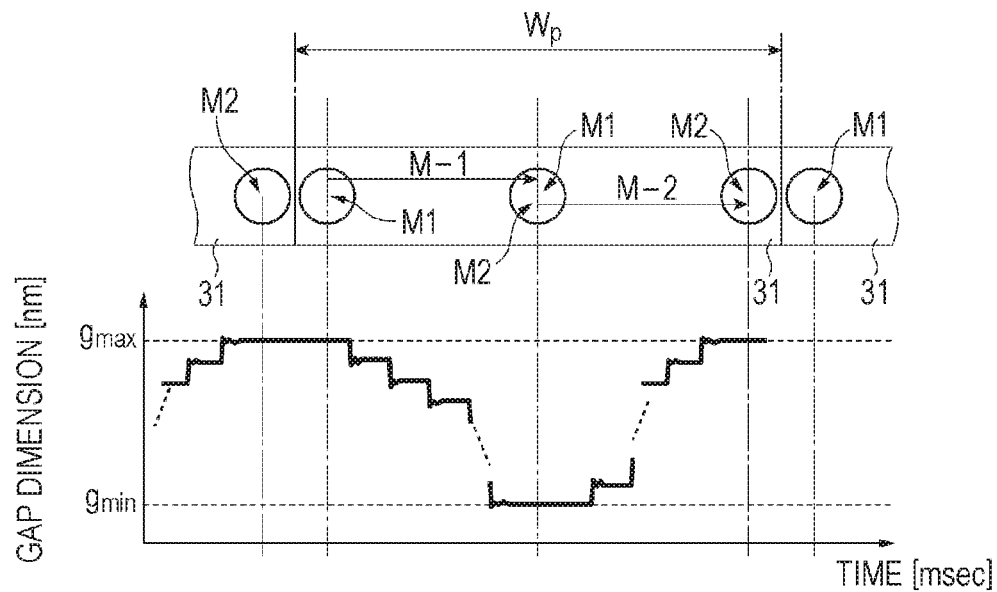
FIG. 12A is a diagram illustrating changes in a gap dimension between reflecting films in a third embodiment.
Figure 12B:
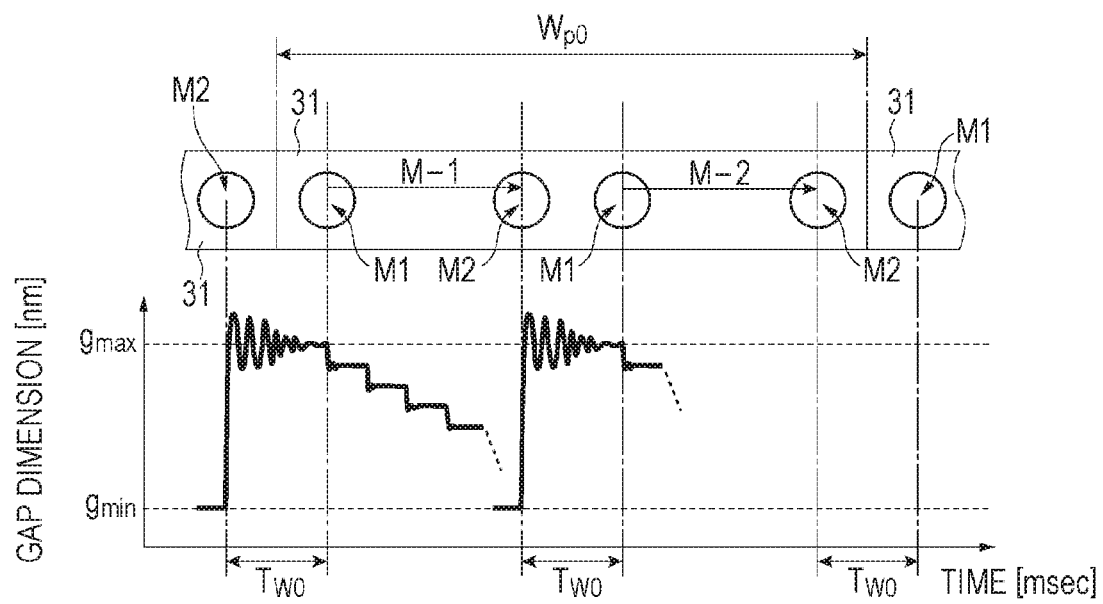
FIG. 12B is a diagram illustrating changes in a gap dimension between reflecting films at a time of scan measurement in the related art.

FIG. 12A is a diagram illustrating changes in the gap dimension between the reflecting films in the third embodiment, and FIG. 12B is a diagram illustrating changes in the gap dimension between the reflecting films at the time of scan measurement in the related art.

As illustrated in FIG. 12A, in the present embodiment, both of the first spectroscopic measurement process and the second spectroscopic measurement process are performed on one color patch 31. As such, by performing spectroscopic measurement of one color patch 31 a plurality of times, more measurement results can be obtained from the color patch, and the accuracy of the spectroscopic measurement can be improved. For example, using the average value of a plurality of spectroscopic measurement results allows a reduction in influence of a noise component if a noise component is included in any of the spectroscopic measurement results.

In the present embodiment, the first spectroscopic measurement process is performed on a first measurement region M-1 in the i-th color patch 31, and then, the second spectroscopic measurement process is performed on a second measurement region M-2 that is contiguous with the first measurement region M-1 on the +X side as illustrated in FIG. 12A. In this case, measurement can be promptly performed compared with a spectroscopic measurement method in the related art, and the patch width dimension $W_p$ of each color patch 31 can be decreased.

That is, in the spectroscopic measurement method of the related as illustrated in FIG. 12B, the spectroscopic measurement process is performed on the first measurement region M-1, and then, the subsequent spectroscopic measurement process cannot be performed during the wait time period $T_{W0}$ until which vibrations in the movable portion 521 stop. Regarding this matter, since the wait time period in the present embodiment is sufficiently small as in the above embodiments, the second spectroscopic measurement process can be performed continuously after the first spectroscopic measurement process.

Effect of Present Embodiment

In the present embodiment, as in the first and second embodiments, the filter controller 184 alternately performs the first spectroscopic measurement process and the second spectroscopic measurement process by alternately performing the first wavelength scan and the second wavelength scan during scan movement of the carriage 13. Accordingly, as in above each embodiment, the scan measurement process can be promptly performed.

In the spectroscopic measurement method of the related art as illustrated in FIG. 12B, the width dimension $M_{p0}$ of each color patch 31 is required to be set to a large value considering the wait time period $T_{W0}$. Regarding this matter, in the present embodiment, the first measurement region M-1 and the second measurement region M-2 can be adjacent to each other as illustrated in FIG. 12A, and the second spectroscopic measurement process can be performed continuously after the first spectroscopic measurement process. Thus, the width dimension $W_p$ of each color patch 31 can be smaller than that in the related art. Accordingly, more color patches 31 can be arranged in one color patch group 30. The total amount of time related to the scan measurement process can be decreased as in the first embodiment.

The patch width dimension $W_p$ may be set to the width dimension $W_{p0}$ as in the related art. In this case, the spectroscopic measurement process can be performed on one color patch 31 more number of times than in the related art. For example, while the spectroscopic measurement process can be performed only twice on one color patch 31 in the spectroscopic measurement method of the related art, the spectroscopic measurement processes in the present embodiment can be performed more number of times, such as three times, since the distance between each measurement region M can be decreased. Accordingly, a spectroscopic measurement result having a higher accuracy can be obtained on the basis of a number of spectroscopic measurement results, and the accuracy of color measurement can be further increased.

While the example illustrated in FIG. 12A illustrates the first spectroscopic measurement process and the second spectroscopic measurement process as being performed once on one color patch 31, the spectroscopic measurement process may be performed three times or more on one color patch 31. In a case of performing the spectroscopic measurement process an odd number of times on one color patch 31, the first spectroscopic measurement process is initially performed on the odd color patches 31, and the second spectroscopic measurement process is initially performed on the even color patches 31.

Fourth Embodiment

Next, a fourth embodiment according to the invention will be described.

In the first embodiment, the total amount of time related to the scan measurement process is decreased by decreasing the wait time period through alternate performance of the first spectroscopic measurement process and the second spectroscopic measurement process.

Regarding this matter, the present embodiment is different from the first embodiment in that the total amount of time related to the scan measurement process is decreased by increasing the speed of movement of the carriage 13 between a plurality of spectroscopic measurement processes.

Figure 13A:
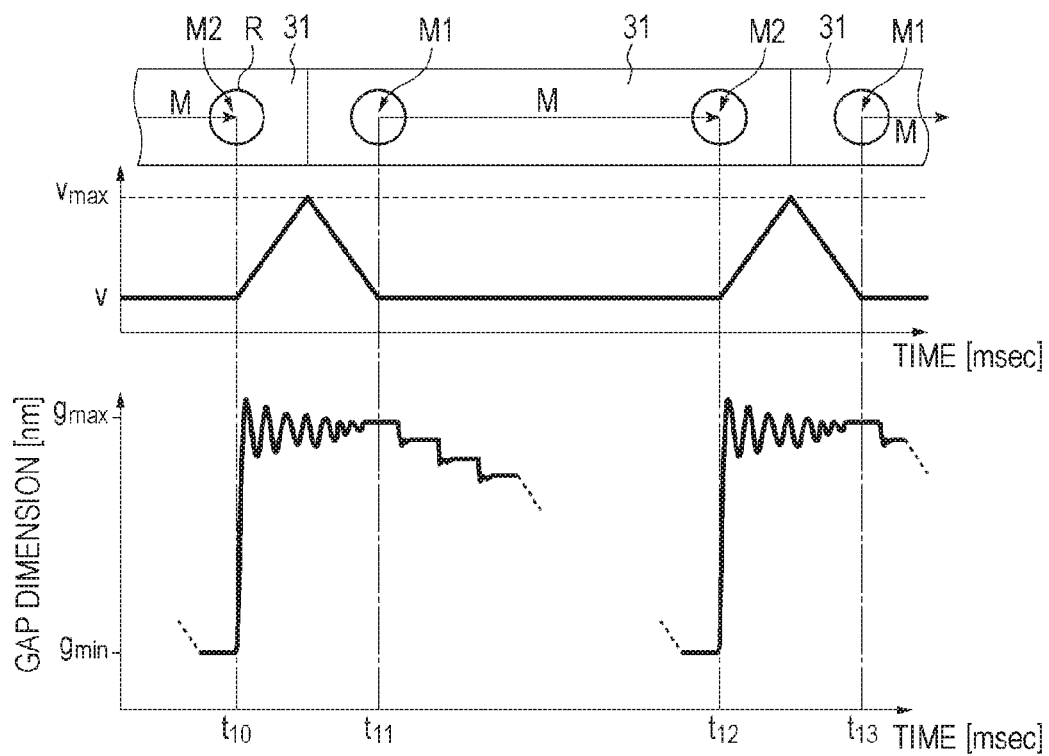
FIG. 13A is a diagram illustrating changes in the speed of movement of a carriage and changes in a gap dimension between reflecting films in a fourth embodiment.
Figure 13B:
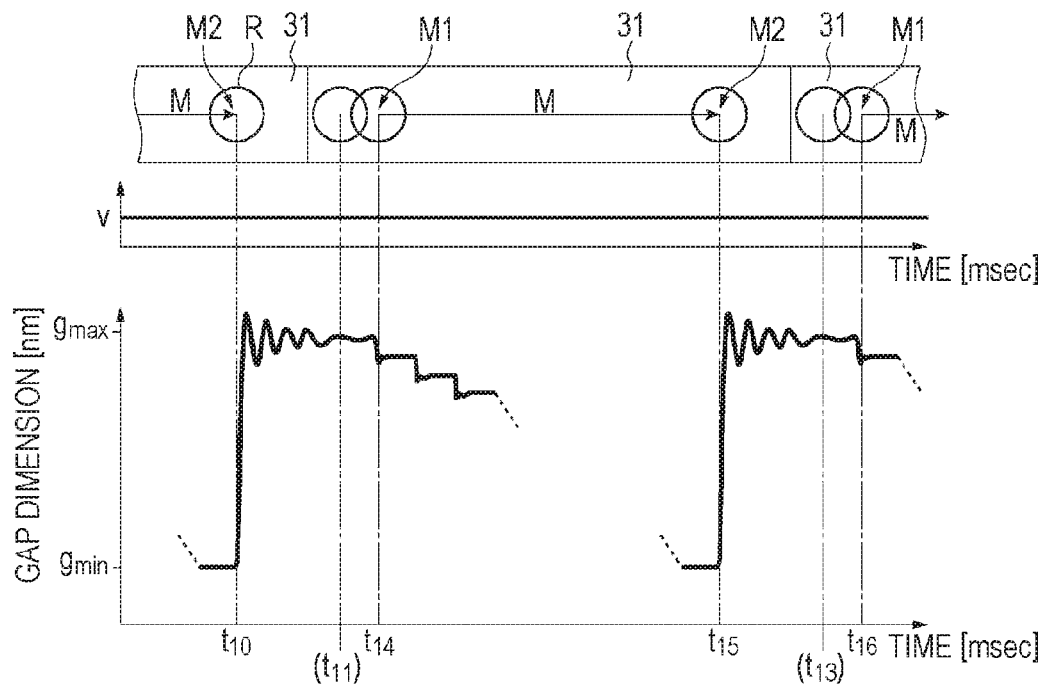
FIG. 13B is a diagram illustrating changes in the speed of movement of a carriage and changes in a gap dimension between reflecting films at a time of scan measurement in the related art.

FIG. 13A is a diagram illustrating changes in the speed of movement of the carriage and changes in the gap dimension between the reflecting films in the fourth embodiment, and FIG. 13B is a diagram illustrating changes in the speed of movement of the carriage and changes in the gap dimension between the reflecting films at the time of scan measurement in the related art.

That is, in the present embodiment, as in the related art, the spectroscopic measurement process is performed while the dimension of the gap G is stepwise decreased at the time of spectroscopic measurement, and the dimension of the gap G returns to the initial gap dimension (maximum gap dimension $g_{max}$) after the end of the spectroscopic measurement process as illustrated in FIG. 13A.

In the spectroscopic measurement process (first region measurement process or first region measurement step) performed on the measurement region M (first measurement region) in the i-th color patch 31, the scanning controller 181 sets the speed v (first speed) of movement of the carriage 13 at which the spectroscopic measurement process does not produce error. The scanning controller 181 sets the speed v of movement of the carriage 13 to a speed (second speed) that is greater than that at the time of spectroscopic measurement as in the second embodiment when the measurement target region R is moved from the end position M2 of the measurement region M in the i-th color patch 31 to the start position M1 of the measurement region M (second measurement region) in the (i+1)-th color patch 31.

Then, if the measurement target region R is moved to the start position M1 of the measurement region M (second measurement region) in the (i+1)-th color patch 31, the scanning controller 181 causes the speed of movement of the carriage 13 to return to the original speed v of movement (third speed=first speed) and initiates the spectroscopic measurement process (second region measurement process or second region measurement step) on the measurement region M.

In the present embodiment, as illustrated in FIGS. 13A and 13B, measurement start times $t_{11}$ and $t_{13}$ of each spectroscopic measurement process in the present embodiment can be smaller than measurement start times $t_{14}$ and $t_{16}$ of each spectroscopic measurement process in the related art, and the total amount of time of the scan measurement process is decreased.

In the present embodiment, the carriage 13 is accelerated or decelerated at an acceleration β that is smaller than the acceleration α in the second embodiment. That is, in the present embodiment, since the dimension of the gap G returns to the initial gap dimension each time spectroscopic measurement is performed once, the dimension of the gap G also vibrates due to vibrations in the movable portion 521. Thus, the period of time from the end of spectroscopic measurement of the i-th color patch 31 until the start of spectroscopic measurement of the (i+1)-th color patch is set to be at least greater than or equal to the wait time period until which the vibrations stop.

Effect of Present Embodiment

In the present embodiment, in the scan measurement process in which the spectroscopic measurement process is performed a plurality of times while the carriage 13 is moved, the speed of movement of the carriage 13 between each spectroscopic measurement process is set to be greater than the speed of movement at the time of spectroscopic measurement. Thus, the scan measurement process can be performed more promptly compared with a case of moving the carriage 13 at, for example, the speed at the time of spectroscopic measurement.

Particularly, in the present embodiment, the spectroscopic measurement process is performed once on each of the plurality of color patches 31, and the speed of movement of the carriage 13 is increased when the measurement target region R moves to an adjacent color patch 31 as illustrated in FIG. 13A. That is, since spectroscopic measurement cannot be accurately performed during the period in which the measurement target region R moves across a boundary between the color patches 31, increasing the speed of the carriage 13 during this period allows a decrease in the total amount of time of the scan measurement process. At the time of spectroscopic measurement, since the speed of movement of the carriage 13 returns to the speed at which measurement results corresponding to a desired number of bands are obtained, a decrease in the accuracy of spectroscopic measurement can be suppressed.

Modification Example

The invention is not limited to each embodiment described above. Modifications, improvements, and configurations obtained by an appropriate combination of each embodiment to the extent capable of achieving the advantage of the invention are to be included in the invention.

While the carriage moving unit 14 that moves the carriage 13 in the +X direction is illustrated as a mover of the invention in above each embodiment, the invention is not limited to this.

For example, a configuration that fixes the carriage 13 and moves the medium A with respect to the carriage 13 may be used. In this case, vibration of the wavelength-selective interference filter 5 accompanied by movement of the carriage 13 can be suppressed, and the transmitted wavelength of the wavelength-selective interference filter 5 can be stabilized.

While the measurement target region R is illustrated as scanning in the X direction the plurality of color patches 31 arranged in the X direction, the measurement target region R may scan the color patches 31 in the Y direction. In this case, the measurement target region R can be moved relative to the color patches 31 by feeding the medium A in the Y direction using the transport unit 12. In this case, the predetermined direction (scanning direction) of the invention corresponds to the Y direction.

While above each embodiment illustrates the color patch group 30 in which the plurality of color patches 31 is adjacently arranged in the X direction, a configuration in which gaps are disposed between each color patch 31 may be used.

While above each embodiment illustrates the first spectroscopic measurement process and the second spectroscopic measurement process as being alternately performed during movement of the carriage 13 to the +X side, the first spectroscopic measurement process and the second spectroscopic measurement process may be alternately performed during movement of the carriage 13 to the −X side.

Alternatively, the spectroscopic measurement process may be performed on the odd rows of the color patch groups 30 arranged in the color chart 3 during movement of the carriage 13 to the +X side, and the spectroscopic measurement process may be performed on the even rows of the color patch groups 30 during movement of the carriage 13 to the −X side.

While the margins $a_1$ and $a_2$ are disposed between the measurement region M and the patch end portions 311 and 312 in above each embodiment, the invention is not limited to this.

For example, margins may not be disposed between the measurement region M and the patch end portions 311 and 312, and the start position M1 of the spectroscopic measurement process may be set to the position at which the first patch end portion 311 overlaps with the first measurement region end portion R1 (immediately after the measurement target region R enters the region of the color patch 31). Similarly, the end position M2 of the spectroscopic measurement process may be set to the position at which the second patch end portion 312 overlaps with the second measurement region end portion R2 (immediately before the measurement target region R moves out of the color patch 31).

Particularly, in the first to third embodiments, since the first spectroscopic measurement process and the second spectroscopic measurement process are alternately performed in the scan measurement process, the gap G does not vibrate significantly, and the wait time period until the stoppage of the vibration is short. Thus, if the measurement start time is set to the timing immediately after the entirety of the measurement target region R enters the color patch 31 and the measurement end time is set to the timing immediately before the measurement target region R moves out of the color patch 31 without disposing margins, measurement results having a sufficient measurement accuracy can be obtained. In this case, since the width dimension $W_p$ of each color patch 31 can be further decreased, the total amount of time of the scan measurement process can be further decreased.

While, in the above embodiments, the range of changes in the gap G is reduced by dividing the measurement wavelength of the wavelength-selective interference filter 5 into a measurement wavelength in which transmitted light is detected as light of the primary peak wavelength and a measurement wavelength in which transmitted light is detected as light of the secondary peak wavelength as illustrated in FIG. 10, the invention is not limited to this. For example, detection may be performed by using all measurement wavelengths as the primary peak wavelength or as the secondary peak wavelength. Alternatively, light of each measurement wavelength may be detected by using three or more measurement ordinal numbers.

While the third embodiment illustrates the second spectroscopic measurement process as being performed continuously after the first spectroscopic measurement process at the time of performing the spectroscopic measurement process a plurality of times on one color patch, a predetermined time interval may be disposed between the first spectroscopic measurement process and the second spectroscopic measurement process.

While, in the above embodiments, the measurement timing obtainer 183 sets the reference position to the position at which the measurement target region R passes the start bar 32 and sets the measurement start time and the measurement end time respectively to the times required for movement of the measurement target region R from the reference position to the start position M1 and to the end position M2, the invention is not limited to this.

For example, the reference position may be set to the state (initial position) where the carriage 13 is positioned in the −X side end portion, and the measurement start time and the measurement end time of the measurement region M may be set for each color patch 31 from the initial position.

Alternatively, the measurement start time and the measurement end time for each color patch 31 may be set by using the timing at which the entirety of the measurement target region R passes the second patch end portion 312 of the previously arranged color patch 31 as a reference.

In the above embodiments, the filter controller 184 performs the first spectroscopic measurement process and the second spectroscopic measurement process by performing the first wavelength scan and the second wavelength scan on the basis of the elapsed time t from the reference timing.

Regarding this matter, the position of the carriage 13 (position of the measurement target region R) in the X direction may be detected by a position sensor or on the basis of the angle of rotation and the number of rotations of a drive motor of the carriage moving unit 14, and the measurement process may be performed on the basis of the detected position of the carriage 13. For example, the filter controller 184 may perform the first wavelength scan and the second wavelength scan by controlling the voltage applied to the electrostatic actuator 56 on the basis of the detected position. In addition, in the second and fourth embodiments, the scanning controller 181 may change the speed of the carriage 13 on the basis of the detected position.

While, in the first and second embodiments, the filter controller 184 performs the first spectroscopic measurement process on the odd color patches 31 and performs the second spectroscopic measurement process on the even color patches 31, the invention is not limited to this. For example, the second spectroscopic measurement process may be performed on the odd color patches 31, and the first spectroscopic measurement process may be performed on the even color patches 31.

While, in the third embodiment, the first spectroscopic measurement process is performed in the odd-numbered instances of the spectroscopic measurement process and the second spectroscopic measurement process is performed in the even-numbered instances of the spectroscopic measurement process, the second spectroscopic measurement process may be performed in the odd-numbered instances of the spectroscopic measurement process, and the first spectroscopic measurement process may be performed in the even-numbered instances of the spectroscopic measurement process.

While the unit controller circuit 152 is illustrated as being disposed in the control unit 15, control circuits as separate units from the control unit 15 may be disposed in each unit as described above. For example, a filter controller circuit that controls the wavelength-selective interference filter 5 and a light reception controller circuit that controls the light receiver 173 may be disposed in the spectroscope 17. A microcomputer and a memory that stores the V-λ data may be incorporated into the spectroscope 17, and the microcomputer may function as the filter controller 184 and the color measurer 185.

While the printing unit 16 is illustrated as an ink jet type that discharges ink supplied from the ink tank by driving the piezoelectric element, the invention is not limited to this. For example, the printing unit 16 may discharge ink by generating an air bubble in the ink using a heater or may discharge ink by using an ultrasonic vibrator.

This is not limited to an ink jet type and can be applied to printers of any printing types such as a thermal printer using thermal transfer, a laser printer, and a dot impact printer.

While, in the above embodiments, the spectroscope 17 is illustrated by a configuration example in which the medium A is irradiated with light of the light source unit 171 in the direction of a line normal to the medium A and the light guide unit 174 causes light reflected by the medium A at 45° to be incident on the wavelength-selective interference filter 5, the invention is not limited to this.

For example, light may be incident on the surface of the medium A at an angle of 45°, and light that is reflected by the medium A in the direction of a line normal to the medium A may be received by the light receiver 173 through the wavelength-selective interference filter 5.

While light that is reflected by the medium A at 45° is received by the light receiver 173 through the wavelength-selective interference filter 5, light reflected at an angle other than 45°, such as 30°, may be received. That is, the angle between the optical axes of the light receiver 173 and the wavelength-selective interference filter 5 may be set in such a manner that light that is reflected by the medium A in a specular manner is not received by the light receiver 173.

While the wavelength-selective interference filter 5 is illustrated as a light transmitting type that transmits light of a wavelength corresponding to the gap G between the reflecting films 54 and 55 from incident light, the invention is not limited to this. For example, a light reflecting wavelength-selective interference filter that reflects light of a wavelength corresponding to the gap G between the reflecting films 54 and 55 may be used. Other types of wavelength-selective interference filters may be used.

While the optical filter device 172 is illustrated as accommodating the wavelength-selective interference filter 5 in the casing 6, the wavelength-selective interference filter 5 may be directly disposed in the spectroscope 17.

While the optical filter device 172 that includes the wavelength-selective interference filter 5 is illustrated as being disposed between the light guide unit 174 and the light receiver 173 (post-dispersive spectroscopy), the invention is not limited to this.

For example, the wavelength-selective interference filter 5 or the optical filter device 172 including the wavelength-selective interference filter 5 may be arranged in the light source unit 171, and the medium A may be irradiated with light that is spectroscopically analyzed by the wavelength-selective interference filter 5 (pre-dispersive spectroscopy).

Furthermore, in the third embodiment, a spectroscopic element is not limited to a wavelength-selective interference filter, and other types of spectroscopic elements may be used. For example, various spectroscopic elements such as an acousto-optic tunable filter (AOTF), a liquid crystal tunable filter (LCTF), and a grating can be used.

While above each embodiment illustrates the printer 10 that includes the spectroscopic measurement device, the invention is not limited to this. For example, the spectroscopic measurement device may not include an image forming unit and perform only the color measurement process on the medium A. The spectroscopic measurement device of the invention may be incorporated into, for example, a quality inspecting apparatus that inspects the quality of a printed matter manufactured in a factory or the like, or besides, the spectroscopic measurement device of the invention may be incorporated into any apparatus.

Besides, a specific structure in embodying of the invention may be configured by appropriately combining above each embodiment and the modification examples to the extent capable of achieving the advantage of the invention, and the structure may be appropriately changed to other structures and the like.

The entire disclosure of Japanese Patent Application No. 2015-123320 filed on Jun. 18, 2015 is expressly incorporated by reference herein.

What is claimed is:

1. A spectroscopic measurement device comprising:
   a spectroscope that includes a wavelength-selective interference filter on which light from a measurement target is incident, the wavelength-selective interference filter including:
      a pair of reflecting films facing to each other via a gap; and
      a gap changer configured to change a dimension of the gap; and
   a moving mechanism that is configured to move the spectroscope relative to the measurement target in a predetermined direction,
   wherein
   the spectroscope is configured to perform a first spectroscopic measurement process in which a spectrum from the measurement target is measured while the dimension of the gap is decreasing, and the spectroscope is configured to perform a second spectroscopic measurement process in which the spectrum from the measurement target is measured while the dimension of the gap is increasing, and
   the first and second spectroscopic measurement processes are alternately performed during the relative movement of the spectroscope in the predetermined direction.

2. The spectroscopic measurement device according to claim 1,
   wherein, when the measurement target is a plurality of color patches that is arranged in the predetermined direction, the spectroscope is relatively moved in the predetermined direction,
   the first spectroscopic measurement process is performed when a region measured by the spectroscope is a first color patch of the plurality of color patches, and
   the second spectroscopic measurement process is performed when the region measured by the spectroscope is a second color patch of the plurality of color patches.

3. The spectroscopic measurement device according to claim 2,
   wherein the second spectroscopic measurement process starts after the first spectroscopic measurement process is finished when the region measured by the spectroscope is one of the plurality of color patches.

4. An image forming apparatus comprising:
   the spectroscopic measurement device according to claim 3; and
   a printer head that is configured to form an image on an image formation target.

5. An image forming apparatus comprising:
   the spectroscopic measurement device according to claim 2; and
   a printer head that is configured to form an image on an image formation target.

6. The spectroscopic measurement device according to claim 1,
   wherein, the measurement target is a color patch, and
   the first spectroscopic measurement process and the second spectroscopic measurement process are performed when a region measured by the spectroscope is the color patch.

7. An image forming apparatus comprising:
   the spectroscopic measurement device according to claim 6; and
   a printer head that is configured to form an image on an image formation target.

8. The spectroscopic measurement device according to claim 1, wherein the moving mechanism is configured to relatively move the spectroscope at a first speed when the spectroscope is configured to perform the first and second spectroscopic measurement processes, and the moving mechanism is configured to relatively move the spectroscope during an interval between the first and second spectroscopic measurement processes at a second speed, and the second speed is greater than the first speed.

9. An image forming apparatus comprising:
the spectroscopic measurement device according to claim 8; and
an image forming unit that forms an image on an image formation target.

10. An image forming apparatus comprising:
the spectroscopic measurement device according to claim 1; and
an image forming unit that forms an image on an image formation target.

11. A spectroscopic measurement device comprising:
a spectroscope that includes a spectroscopic element on which light from a measurement target is incident, the measurement target including first and second regions arranged in a predetermined direction; and
a moving mechanism that is configured to move the spectroscope relative to the measurement target in the predetermined direction,
wherein the spectroscope is configured to perform a first spectroscopic measurement process in which a spectrum from the first region is measured while the moving mechanism relatively moves the spectroscope at a first speed,
the spectroscope is configured to perform a second spectroscopic measurement process in which a spectrum from the second region is measured while the moving mechanism relatively moves the spectroscope at a second speed,
the moving mechanism relatively moves the spectroscope during an interval between the first and second spectroscopic measurement processes at a third speed, and the third speed is greater than the first and second speeds.

12. The spectroscopic measurement device according to claim 11,
wherein the measurement target is a plurality of color patches that is arranged in the predetermined direction, and
the first region is a first color patch of the plurality of color patches, and the second region is a second color patch of the plurality of color patches.

13. An image forming apparatus comprising:
the spectroscopic measurement device according to claim 12; and
a printer head that is configured to form an image on an image formation target.

14. An image forming apparatus comprising:
the spectroscopic measurement device according to claim 11; and
a printer head that is configured to form an image on an image formation target.

15. A spectroscopic measurement method for a spectroscopic measurement device, the spectroscopic measurement device including:
a spectroscope which includes a wavelength-selective interference filter on which light from a measurement target is incident, the wavelength-selective interference filter including:
a pair of reflecting films facing to each other via a gap; and
a gap changer configured to change a dimension of the gap; and
a moving mechanism configured to move the spectroscope relative to the measurement target in a predetermined direction, the method comprising:
performing a first spectroscopic measurement process so as to measure a spectrum from the measurement target while the dimension of the gap is decreasing; and
performing a second spectroscopic measurement process so as to measure the spectrum from the measurement target while the dimension of the gap is increasing,
wherein the first spectroscopic measurement process and the second spectroscopic measurement process are alternately performed during the relative movement of the spectroscope in the predetermined direction.

16. A spectroscopic measurement method for a spectroscopic measurement device, the spectroscopic measurement device including:
a spectroscope which includes a spectroscopic element on which light from a measurement target is incident, the measurement target including first and second regions arranged in a predetermined direction, the spectroscope is configured to measure a spectrum from the measurement target; and
a moving mechanism configured to move the spectroscope relative to the measurement target in the predetermined direction, the method comprising:
performing a first spectroscopic measurement process so as to measure a spectrum from the first region while the moving mechanism relatively moves the spectroscope at a first speed;
relatively moving the spectroscope from an end of the first region to a beginning of the second region at a second speed; and
performing a second spectroscopic measurement process so as to measure the spectrum from the second region at a third speed,
wherein the second speed is greater than the first speed and the third speed.

* * * * *